US012707429B2

(12) United States Patent
Rachid et al.

(10) Patent No.: US 12,707,429 B2
(45) Date of Patent: Aug. 11, 2026

(54) METHODS AND DEVICES FOR ESTIMATING THE POSITION OF AN RF SOURCE

(71) Applicant: SILVUS TECHNOLOGIES, INC., Los Angeles, CA (US)

(72) Inventors: Mansour Rachid, Los Angeles, CA (US); Matthew Hayes, Los Angeles, CA (US); Hakan Akan, Los Angeles, CA (US)

(73) Assignee: SILVUS TECHNOLOGIES, INC., Los Angeles, CA (US)

( * ) Notice: Subject to any disclaimer, the term of this patent is extended or adjusted under 35 U.S.C. 154(b) by 708 days.

(21) Appl. No.: 18/151,103

(22) Filed: Jan. 6, 2023

(65) Prior Publication Data

US 2024/0236931 A1 Jul. 11, 2024

(51) Int. Cl.
*H04W 64/00* (2009.01)
*G01S 5/02* (2010.01)

(52) U.S. Cl.
CPC ......... *H04W 64/006* (2013.01); *G01S 5/0289* (2013.01)

(58) Field of Classification Search
CPC ................................ H04W 64/00; G01S 5/02
See application file for complete search history.

(56) References Cited

U.S. PATENT DOCUMENTS 5,418,784 A 5/1995 Ramakrishnan et al.
5,436,903 A 7/1995 Yang et al.
6,038,225 A 3/2000 Nago
6,175,739 B1 1/2001 Ishii et al.
6,219,053 B1 4/2001 Tachibana
6,556,582 B1 4/2003 Redi
6,754,176 B1 6/2004 Gubbi et al.
6,760,371 B1 7/2004 Bach
6,788,658 B1 9/2004 Bims
6,980,561 B1 12/2005 Abi-Nassif
D590,410 S 4/2009 Wall
D638,024 S 5/2011 Wall
8,107,966 B2 1/2012 Choi et al.
(Continued)

FOREIGN PATENT DOCUMENTS

CN 303605235 3/2016
CN 303655182 4/2016
(Continued)

OTHER PUBLICATIONS

Boksiner, et al., "Centrally Controlled Dynamic Spectrum Access for MANETs" 2013 IEEE Military Communications Conference, IEEE Computer Society, 978-0-7695-5124, pp. 641-646, Milcom, Jan. 2013.

(Continued)

*Primary Examiner* — Myron Wyche

(57) ABSTRACT

A sensor system may be configured to identify a location of a radio frequency (RF) source using an angle of arrival estimation technique. A sensor system may identify a candidate location of an RF source using hyperbola positioning techniques with two or more antennas at a similar geolocation with reference to the RF source. The sensor system may additionally be able to identify a plurality of RF sources using two or more antennas at a similar geolocation.

20 Claims, 11 Drawing Sheets

(56) References Cited

U.S. PATENT DOCUMENTS

| | | | |
|---|---|---|---|
| 8,160,090 | B2 | 4/2012 | Yoshizawa et al. |
| 8,462,709 | B2 | 6/2013 | Nanda et al. |
| 8,483,620 | B2 | 7/2013 | Horn et al. |
| 8,537,730 | B2 | 9/2013 | Liu et al. |
| D692,451 | S | 10/2013 | Pearcy |
| 8,588,091 | B2 | 11/2013 | Trainin |
| D708,193 | S | 7/2014 | Agnew |
| D710,863 | S | 8/2014 | Agnew |
| 8,837,435 | B2 | 9/2014 | Singh et al. |
| 8,861,445 | B2 | 10/2014 | Jing et al. |
| 8,873,470 | B2 | 10/2014 | Cordeiro et al. |
| 8,879,573 | B2 | 11/2014 | Bahl et al. |
| 8,913,597 | B2 | 12/2014 | Benveniste |
| 9,014,207 | B2 | 4/2015 | Goel et al. |
| 9,094,986 | B2 | 7/2015 | Horn et al. |
| 9,173,235 | B2 | 10/2015 | Lim et al. |
| 9,258,195 | B1 | 2/2016 | Pendleton |
| 9,407,298 | B1 | 8/2016 | Hwang et al. |
| 9,445,278 | B2 | 9/2016 | Sadek et al. |
| 9,503,286 | B2 | 11/2016 | Han et al. |
| D775,196 | S | 12/2016 | Huang |
| D781,302 | S | 3/2017 | Baguley |
| D789,416 | S | 6/2017 | Baluja |
| D812,634 | S | 3/2018 | Tuthill |
| D824,922 | S | 8/2018 | McGovern |
| D841,671 | S | 2/2019 | Clavin |
| D859,433 | S | 9/2019 | Kim |
| D867,389 | S | 11/2019 | Jamison |
| D886,834 | S | 6/2020 | Chitalia |
| 10,728,121 | B1 | 7/2020 | Chitalia |
| D908,137 | S | 1/2021 | Varghese et al. |
| D916,828 | S | 4/2021 | Daie |
| D936,697 | S | 11/2021 | Hosokuni |
| 11,188,445 | B2 | 11/2021 | Knowles et al. |
| 11,226,126 | B2 | 1/2022 | Przybylski et al. |
| 11,226,975 | B2 | 1/2022 | Patthak et al. |
| 11,258,807 | B2 | 2/2022 | Muddu et al. |
| 11,290,348 | B1 | 3/2022 | Margaria et al. |
| D947,890 | S | 4/2022 | Yamasaki |
| 11,294,789 | B2 | 4/2022 | Knowles et al. |
| 11,340,931 | B2 | 5/2022 | Krishna et al. |
| 11,381,285 | B1 | 7/2022 | Shattil |
| 11,463,325 | B2 | 10/2022 | D'Ippolito |
| D968,425 | S | 11/2022 | Bhardwaj |
| 11,507,262 | B2 | 11/2022 | Campbell |
| D982,021 | S | 3/2023 | Daneshvar et al. |
| 11,706,099 | B2 | 7/2023 | Chitalia |
| 11,743,135 | B2 | 8/2023 | Mordani |
| 11,963,026 | B2 | 4/2024 | Daneshvar et al. |
| D1,030,790 | S | 6/2024 | Seo |
| 12,058,015 | B2 | 8/2024 | Erickson |
| 12,144,011 | B2 | 11/2024 | Zhu et al. |
| 12,166,516 | B2 | 12/2024 | Rachid |
| 2004/0071154 | A1 | 4/2004 | Wentink |
| 2004/0146022 | A1 | 7/2004 | Lewis et al. |
| 2004/0240426 | A1 | 12/2004 | Wu et al. |
| 2005/0169185 | A1 | 8/2005 | Qiu |
| 2007/0177520 | A1 | 8/2007 | Morinaga et al. |
| 2008/0052378 | A1 | 2/2008 | Matsuyama |
| 2008/0052379 | A1 | 2/2008 | Matsuyama |
| 2009/0262688 | A1 | 10/2009 | Tsai et al. |
| 2010/0074141 | A1 | 3/2010 | Nguyen |
| 2010/0075704 | A1 | 3/2010 | McHenry et al. |
| 2010/0165899 | A1 | 7/2010 | Van Bosch et al. |
| 2011/0314145 | A1 | 12/2011 | Raleigh et al. |
| 2012/0082040 | A1 | 4/2012 | Gong et al. |
| 2012/0327870 | A1 | 12/2012 | Grandhi et al. |
| 2013/0058222 | A1 | 3/2013 | Yehezkel et al. |
| 2013/0163575 | A1 | 6/2013 | Pak et al. |
| 2013/0201857 | A1 | 8/2013 | Bhargava et al. |
| 2013/0311832 | A1 | 11/2013 | Lad |
| 2014/0050203 | A1 | 2/2014 | Doppler et al. |
| 2014/0066050 | A1 | 3/2014 | Kotecha et al. |
| 2014/0079016 | A1 | 3/2014 | Dai et al. |
| 2014/0092877 | A1 | 4/2014 | Kazmi et al. |
| 2014/0094130 | A1 | 4/2014 | Elenes et al. |
| 2014/0169290 | A1 | 6/2014 | Seok |
| 2014/0307639 | A1 | 10/2014 | Jung et al. |
| 2014/0328265 | A1 | 11/2014 | Sampath et al. |
| 2015/0113118 | A1 | 4/2015 | Jain |
| 2015/0245282 | A1 | 8/2015 | Kim et al. |
| 2015/0264689 | A1 | 9/2015 | Sampath et al. |
| 2015/0333933 | A1 | 11/2015 | Lopez de Victoria |
| 2016/0050683 | A1 | 2/2016 | Gupta et al. |
| 2016/0294650 | A1 | 10/2016 | Padhye |
| 2016/0337094 | A1 | 11/2016 | Andreoli-Fang et al. |
| 2017/0026270 | A1 | 1/2017 | Handige Shankar |
| 2017/0085334 | A1 | 3/2017 | Ishioka |
| 2017/0310552 | A1 | 10/2017 | Wallerstein |
| 2017/0357389 | A1 | 12/2017 | Fleizach et al. |
| 2018/0136798 | A1 | 5/2018 | Aggour |
| 2019/0053293 | A1 | 2/2019 | Akoum et al. |
| 2019/0116504 | A1 | 4/2019 | Rusackas |
| 2019/0174383 | A1 | 6/2019 | Zhang et al. |
| 2019/0281507 | A1 | 9/2019 | Rahat et al. |
| 2019/0320462 | A1 | 10/2019 | Li et al. |
| 2020/0007405 | A1 | 1/2020 | Chitalia |
| 2020/0067952 | A1 | 2/2020 | Deaguero |
| 2020/0084759 | A1 | 3/2020 | Liu et al. |
| 2020/0403881 | A1 | 12/2020 | DeLuca |
| 2021/0026677 | A1 | 1/2021 | Krishna |
| 2021/0028962 | A1 | 1/2021 | Schelstraete et al. |
| 2021/0028996 | A1 | 1/2021 | Mordani |
| 2021/0153089 | A1 | 5/2021 | Nayak et al. |
| 2021/0258029 | A1 | 8/2021 | Cyzs |
| 2021/0297868 | A1 | 9/2021 | Beck et al. |
| 2021/0314112 | A1 | 10/2021 | Balasubramanian |
| 2021/0320678 | A1 | 10/2021 | Luo |
| 2022/0345235 | A1* | 10/2022 | Mondal .................. H04H 60/51 |
| 2022/0385547 | A1 | 12/2022 | Daneshvar et al. |
| 2023/0033786 | A1 | 2/2023 | Rachid et al. |
| 2025/0039744 | A1 | 1/2025 | Rachid et al. |
| 2025/0202513 | A1 | 6/2025 | Rachid |
| 2025/0261137 | A1 | 8/2025 | Rachid et al. |

FOREIGN PATENT DOCUMENTS

| | | | |
|---|---|---|---|
| CN | 305391642 | | 10/2019 |
| EP | 2088811 | A1 | 8/2009 |
| EP | 1603283 | B1 | 9/2010 |
| EP | 2744292 | A1 | 6/2014 |
| EP | 2866514 | A2 | 4/2015 |
| KR | 2006010018 | A | 2/2006 |
| WO | WO 2005039105 | A1 | 4/2005 |
| WO | WO 2006106459 | A1 | 10/2006 |
| WO | WO 2007098136 | A2 | 8/2007 |
| WO | WO 2011129634 | A3 | 1/2012 |
| WO | WO 2014124131 | A2 | 8/2014 |
| WO | WO 2019/006730 | A1 | 1/2019 |
| WO | WO 2020/020283 | A1 | 1/2020 |

OTHER PUBLICATIONS

Jones et al., "A Dynamic Spectrum Access Mac Applique for Legacy Military Radios" The John Hopkins University Applied Physics Laboratory, 978-1-4244-2677, pp. 1-5, Milcom, May 2008.

Kumar et al., "Medium Access Control Protocol for AD-HOC Wireless Networks: A Survey" Electrical and Computer Engineering Department, Clarkson University, Embedded Software for Digital Televisions Group, ATI Research, and Department of Computer Science, University of New Orleans, pp. 1-54, 2004.

Marinho et al., "Cognitive Radio: Survey on Communication Protocols, Spectrum Decision Issues, and Future Research Directions" Wireless Netw, vol. 18, pp. 147-164, 2012.

Nasipuri, et al., "Performance of Multichannel Wireless Ad HOC Networks" Int. J. Wireless and Mobile Computing, vol. 1, Nos. ¾, pp. 191-203, 2006.

Park et al., Performance of Joint Spectrum Sensing and MAC Algorithms for Multichannel Opportunistic Spectrum Access Ad Hoc Networks, IEEE Transactions on Mobile Computing, vol. 10, No. 7, pp. 1011-1027, Jul. 2011.

(56) References Cited

OTHER PUBLICATIONS

Perich et al., "Efficient Dynamic Spectrum Access Implementation" The 2010 Military Communications Conference—Unclassified Program—Networking Protocols and Performance Track, 978-1-4244-8180, pp. 1887-1892, Apr. 2010.
Redi, et al., "The DARPA WNaN Network Architecture" The 2011 Military Communications Conference—Track 6—Department of Defense Programs, 978-1-4673-0081, pp. 2258-2263, 2011.
Seelig, et al. "A Description of the Aug. 2006 XG Demonstrations at Fort A. P. Hill" U.S. Department of Defense Advanced Research Projects Agency, 1-4244-0663, pp. 1-12, Mar. 2007.
Shiang et al., "Distributed Resource Management in Multihop Cognitive Radio Networks for Delay-Sensitive Transmission" IEEE Transactions on Vehicular Techonology, vol. 58, No. 2, pp. 941-953, Feb. 2009.
Ye, et al., "An Energy-Efficient MAC Protocol for Wireless Sensor Networks" Information Science Institute, University of Southern California Computer Science Department, 2011.
Yucek et al., "A Survey of Spectrum Sensing Alforithms for Cognitive Radio Applications" IEEE Communications Surveys & Tutorials, vol. 11, No. 1, pp. 116-130, 2009.
Zhao et al., "A Survey of Dynamic Spectrum Access" IEEE Signal Processing Magazine 1053-5888, pp. 79-89, May 2007.
Zhao et al., "Decentralized Cognitive MAC for Opportunistic Spectrum Access in Ad Hoc Networks: A Pomdp Framework" IEEE Journal on Selected Areas in Communications, vol. 25, No. 3, pp. 589-600, Apr. 2007.
The Mac Level (link layer), downloaded on Dec. 7, 2015 from website: http://www.labs.hpe.com/personal/Jean_Tourrilhes/Linux/Linux.Wireless.mac.html, 2000.
Chevillat, et al., "Dynamic Data Rate and Transmit Power Adjustment in IEEE 802.11 Wireless LANs," Int J Wireless Inf Networks 12, 123-145 (2005).
Holland, et al., "A Rate-Adaptive MAC Protocol for Multi-Hop Wireless Networks," In Proceedings of the 7th annual international conference on Mobile computing and networking (MobiCom '01). Association for Computing Machinery, New York, NY, USA, 236-251.
Qiao, et al., "Goodput enhancement of IEEE 802.11a wireless LAN via link adaptation," ICC 2001. IEEE International Conference on Communications. Conference Record (Cat. No. 01CH37240), Helsinki, Finland, pp. 1995-2000 vol. 7, 2001.
SC3500 Quick Start Guide CSMA, Doc. 10009C000 Version 1.2, dated May 10, 2012; 10 pages.
SteamCaster MIMO Radio User Manual, Doc. 10017C000 Version 3.12, dated Jun. 2, 2015; 70 pages.
SteamCaster MIMO Radio User Manual, Doc. 10017C000 Version 3.12.5, dated Oct. 7, 2016; 92 pages.
SteamCaster MIMO Radio User Manual, Doc. 10017C000 Version 3.15.0.3, dated Sep. 4, 2018; 146 pages.
SteamCaster MIMO Radio User Manual, Doc. 10017C000 Version 3.15.0.4, dated Oct. 23, 2018; 134 pages.
SteamCaster MIMO Radio User Manual, Doc. 10017C000 Version 3.15.0.5, dated Dec. 19, 2018; 137 pages.
SteamCaster MIMO Radio User Manual, Doc. 10017C000 Version 3.17.0.5, dated Apr. 30, 2019; 158 pages.
Baivector. "Structure molecule and communication." Shutterstock, published Jan. 8, 2018 (Retrieved from the Internet May 21, 2025). Internet URL: <https://www.shutterstock.com/image-vector/structure-molecule-communication-dna-atom-neurons-790269595>.
Sunward Art. "Social media communication digital concept." Shutterstock, published Jul. 14, 2019 (Retrieved from the Internet May 21, 2025). Internet URL: <https://www.shutterstock.com/image-vector/social-media-communication-digital-concept-network-1451764961>.

* cited by examiner

DETERMINING LOCATION OF RF SOURCE WITH STATIONARY SENSOR

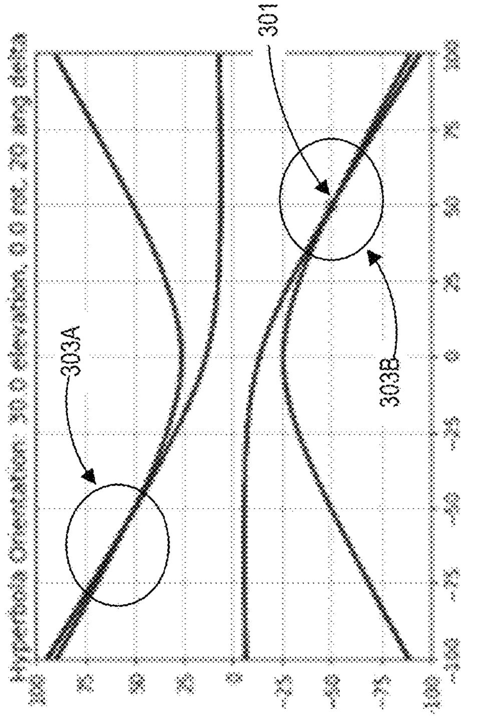
FIG. 3A
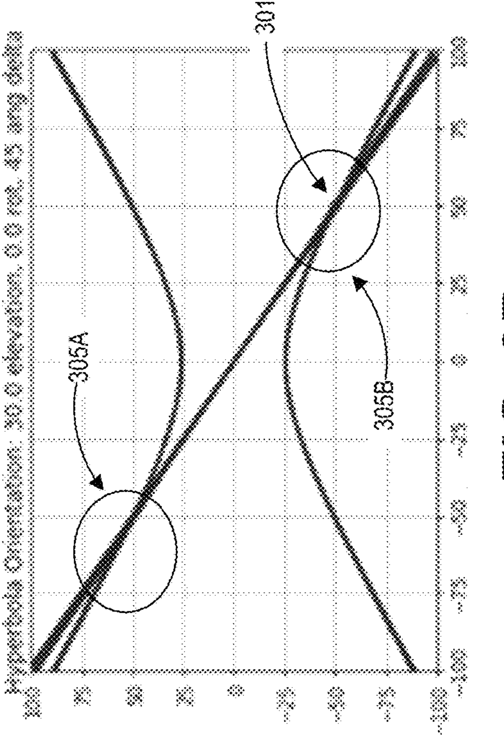
FIG. 3B
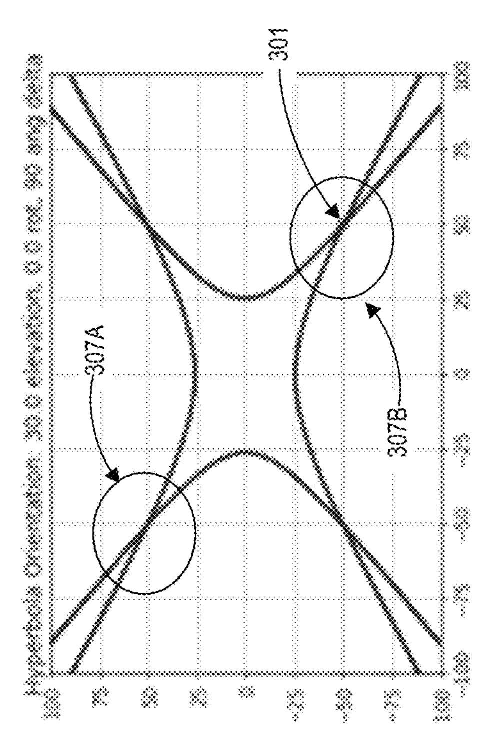
FIG. 3C
FIG. 3D

METHODS AND DEVICES FOR ESTIMATING THE POSITION OF AN RF SOURCE

FIELD OF THE INVENTION

The present disclosure relates to position estimation of radio frequency sources.

BACKGROUND

Identification of the direction of a received signal from a source of a radio frequency signal can be accomplished using angle of arrival (AoA) estimation techniques. This technique can be used for geolocation of devices, such as cell phones, military radio transmitters, or other sources of radio frequency (RF) signals.

Radar systems can identify a range or distance that a source is from a sensor by identifying a round trip delay of a signal emitted from the sensor location to when it is received after reflecting off a target. However, radar systems are not passive in that they require transmission of a signal. This is not always ideal in a situation where radio emissions are dangerous to emit or where it is desired to hide a location of a sensor or receiver, such as in some military applications.

SUMMARY

Disclosed herein are systems and methods to identify a location of an RF source using a passive system (e.g. with just sensors or receivers) with just one sensor location. Advantageously, the systems and methods disclosed herein may allow for geolocation of one or more RF sources using two or more receivers at a single sensor location. The sensor location can be static or moving. Systems and methods can, in some cases, identify a plurality of emitting RF sources. Also, embodiments are not limited to receivers at a single sensor location.

For purposes of summarizing the disclosure, certain aspects, advantages and novel features have been described herein. It is to be understood that not necessarily all such advantages can be achieved in accordance with any particular embodiment disclosed herein. Thus, the embodiments disclosed herein can be embodied or carried out in a manner that achieves or optimizes one advantage or group of advantages as taught or suggested herein without necessarily achieving others.

In some configurations, a system for determining the location of a radio frequency (RF) source can include: a sensor system, which can include: a first antenna configured to receive a signal from the RF source; a second antenna configured to receive the signal from the RF source; one or more hardware processors in communication with the sensor system, the one or more hardware processors configured to: receive, at a first time, a first signal from the RF source at the first antenna; receive, at the first time, a second signal from the RF source at the second antenna; generate a first angle estimate based on a cross-correlation between the first signal and the second signal, the first angle estimate comprising an estimate of an angle between the sensor system and the RF source; determine a first set of candidate locations of the RF source based at least in part on the first angle estimate; receive, at a second time, a third signal from the RF source at the first antenna; receive, at the second time, a fourth signal from the RF source at the second antenna; generate a second angle estimate based on a cross-correlation between the third and fourth signal, the second angle estimate comprising an estimate of an angle between the sensor system and the RF source; determine a second set of candidate locations of the RF source based at least in part on the second angle estimate; and estimate a location of the RF source based on the first set of candidate locations and the second set of candidate locations.

In some configurations, a system for identifying at least one RF source can include: one or more hardware processors, the one or more hardware processors configured to: generate a first set of candidate locations for the RF source based at least in part on a cross correlation of signals received at a first antenna and a second antenna of a sensor system at a single location, the first antenna and second antenna being in a first orientation; move the first antenna and the second antenna from the first orientation into a second orientation; generate a second set of candidate locations for the RF source based at least in part on a cross correlation of received signals at the first antenna and the second antenna of the sensor system at the single location, the first antenna and second antenna being in the second orientation; estimate a location of the RF source based on the first set of candidate locations and the second set of candidate locations.

In some configurations, a system for identifying at least one RF source can include: one or more hardware processors, the one or more hardware processors configured to: generate a first set of candidate locations for the RF source based at least in part on a cross correlation of signals received at a first antenna and a second antenna of a sensor system at a first location; generate a second set of candidate locations for the RF source based at least in part on a cross correlation of received signals at the first antenna and the second antenna of the sensor system at a second location different from the first location; estimate a location of the RF source based on the first set of candidate locations and the second set of candidate locations.

In some configurations, the system for identifying at least one RF source can include: one or more hardware processors, the one or more hardware processors configured to: generate a first set of candidate locations for the RF source based at least in part on a cross correlation of signals received at a first antenna pair of a sensor system at a single location, wherein the sensor system comprises three or more antennas; generate a second set of candidate locations for the RF source based at least in part on a cross correlation of received signals at a second antenna pair of the sensor system at the single location, the second antenna pair comprising a different subset of antennas of the three or more antennas than the first antenna pair; estimate a location of the RF source based on the first set of candidate locations and the second set of candidate locations.

In some configurations, a system for determining a location of at least one RF source can include: a sensor system comprising a plurality of antennas at a same or nearby location, the plurality of antennas configured to receive signals from a plurality of RF sources; and one or more hardware processors in communication with the sensor system, the one or more hardware processors configured to: generate a first set of angle estimates based at least in part on a cross correlation of signals received at a first antenna and a second antenna of the plurality of antennas; analyze the first set of angle estimates to determine a first set of clusters, each cluster comprising one or more angles of the first set of angle estimates; determine a received power for each cluster of the first set clusters; generate a second set of angle estimates based at least in part on a cross correlation of signals received at the first antenna and a third antenna of the plurality of antennas; analyze the second set of angle estimates to determine a second set of clusters, each cluster comprising one or more angles of the second set of angle estimates; determine a received power for each cluster of the second set clusters; determine a mapping between the first set of clusters and the second set of clusters based at least in part on a comparison of the received powers of the first set of clusters and the received powers of the second set of clusters; and identify a location of at least one RF source based at least in part on the mapping.

In some configurations, a system for determining a location of at least one RF source previously unidentified RF source can include: a movable platform; a plurality of antennas coupled to the movable platform, wherein the plurality of antennas configured to receive signals from a plurality of RF sources in the environment of the movable platform, wherein at least one pair of antennas of the plurality of antennas are spaced a distance from each other of less than or equal to one wavelength of a carrier wave of the RF source; and one or more hardware processors configured to communicate with the plurality of antennas and generate an identify the presence of at least one RF source of the plurality of RF sources based at least in part on a received power associated with the signals and two or more cross correlations of signals received at different pairs of antennas of the plurality of antennas.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

FIGS. 3A-3D illustrate example hyperbola projections at different angles of orientation of a rotating sensor pair.

DETAILED DESCRIPTION

Systems and methods disclosed herein relate to identifying an estimate of a geolocation of one or more RF sources. In some examples, the estimate may be performed using a sensor pair at a single or nearby geographic location. In some examples, the estimate may be performed using more than two sensors at a single or nearby geographic location. The systems and methods disclosed herein may identify an estimate of a geographic location of one or more RF sources without the use of a transmission signal (for example, the systems and methods described herein may be considered a passive system). The systems and methods disclosed herein may be configured to distinguish and identify a single or multiple RF sources in a moving or static system.

Example Sensor System

Figure 1:
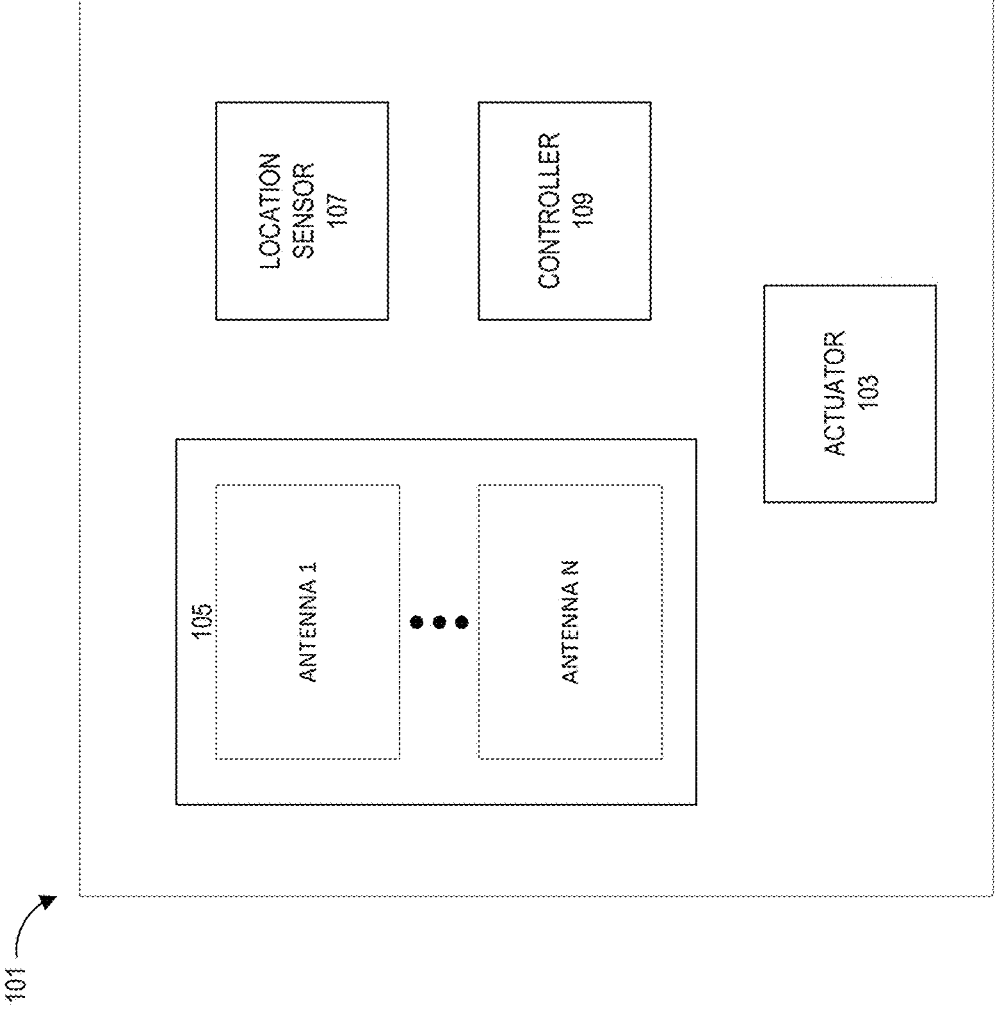
FIG. 1 illustrates an example of a hardware system that may be utilized as part of systems and methods described herein.

FIG. 1 illustrates an example of a hardware system 101 that may be utilized as part of systems and methods described herein. A hardware system 101 may include, but is not limited to, at least one antenna or sensor 105, location sensor 107, controller 109, and actuator 103. A hardware or sensor system described herein may or may not include all of these components or multiples of one or more of these components. For example, in some systems, a hardware system 101 may not include a location sensor 107 and/or may not include an actuator 103.

In some examples, a hardware system 101 may be part of and/or coupled to a system, vehicle, or platform configured to move in two or three dimensional space. For example, a hardware system 101 may be coupled to or part of a drone or plane configured to move in three-dimensional space. In some examples, a hardware system 101 may be part of and/or coupled to a stationary system, vehicle, or platform. A configuration of a hardware system 101 may be different based on the system, vehicle, and/or platform the hardware system 101 is configured to be a part of or couple to. For example, a stationary configuration may include an actuator 103 and/or may not include a location sensor 107. In another example, a moving configuration may include a locations sensor 107 and may or may not include an actuator 103.

As illustrated in FIG. 1, a hardware system 101 can include at least one antenna or sensor 105. The at least one antenna or sensor 105 can include at least one sensor pair. A sensor pair can include two or more RF antennas. The RF antennas may be configured to receive RF signals from an RF source. However, other types of signals may and/or receiving sensors may additionally or alternatively be used to receive a signal from a source. The antennas (or sensors) 105 may be configured to be located near to each other in relation to a source in an unknown location relative to the sensor system 101 and/or sensors 105. For example, the antennas 105 may be located within 1 meter of other antennas or more or less distance. In some examples, the antennas 105 may be located within a fraction of a wavelength of the carrier frequency. A fraction can be 0.25, 0.5, 1.0 or other fraction of the wavelength of the carrier frequency. For example, a 900 MHz carrier has 0.33 meters wavelength, 2.4 GHz has 0.125 meters and the antennas 105 may be located within a fraction of those wavelengths. However, any other suitable spacing is possible. In some examples, the antennas 105 may be spaced apart by more than one wavelength.

The antennas 105 may be oriented within the hardware system to be rotated or otherwise moved by an actuator 103. The actuator 103 may be configured to rotate the antennas 105 up to 360 degrees from an original position or orientation. For example, a system 101 can include three antennas 105 paired to an actuator 103. The actuator 103 can be configured to rotate the three antennas 105 in an arc with an origin at the center of a triangle formed by the positions of the three antennas 105. The actuator 103 can be configured to rotate the three antennas 105 twenty, forty-five, ninety, one hundred twenty-five degrees, or a different amount of rotation.

A hardware system 101 can include a location sensor 107. In some examples, a hardware system 101 can additionally or alternatively receive location information from a system, vehicle, or platform associated that may be part of or coupled to the hardware system 101. Location information can include, but is not limited to, a height and geolocation of the sensor system and/or other aspects of a hardware system 101 or platform or vehicle associated with the sensor or hardware system 101. In some examples, the hardware system 101 may be coupled to a drone or other aircraft. The hardware system 101 may receive location and/or height data from the drone or other aircraft. In addition or in the alternative, some or all of that information may come from a location (and/or height) sensor 107 configured to determine a location and/or height of the hardware system 101.

A hardware system 101 may include a controller 109. The controller 109 may include one or more hardware processors configured to, for example, store, process, send and/or receive data. In some examples, the controller 109 may be configured to execute one or more processes described herein. In some examples, the controller 109 may at least in part be cloud-based. In some examples, the controller 109 may include one or more local hardware processors. In some examples, the controller 109 may be configured to process and/or analyze location data, height data, RF signals and data associated with the one or more antenna 105, and/or other data. In some examples, the controller 109 may be configured to, for example, execute instructions to control the actuator 103, and/or store, display and/or output information associated with, for example, the geolocation of an RF source.

Identification of a Single RF source

Figure 2A:
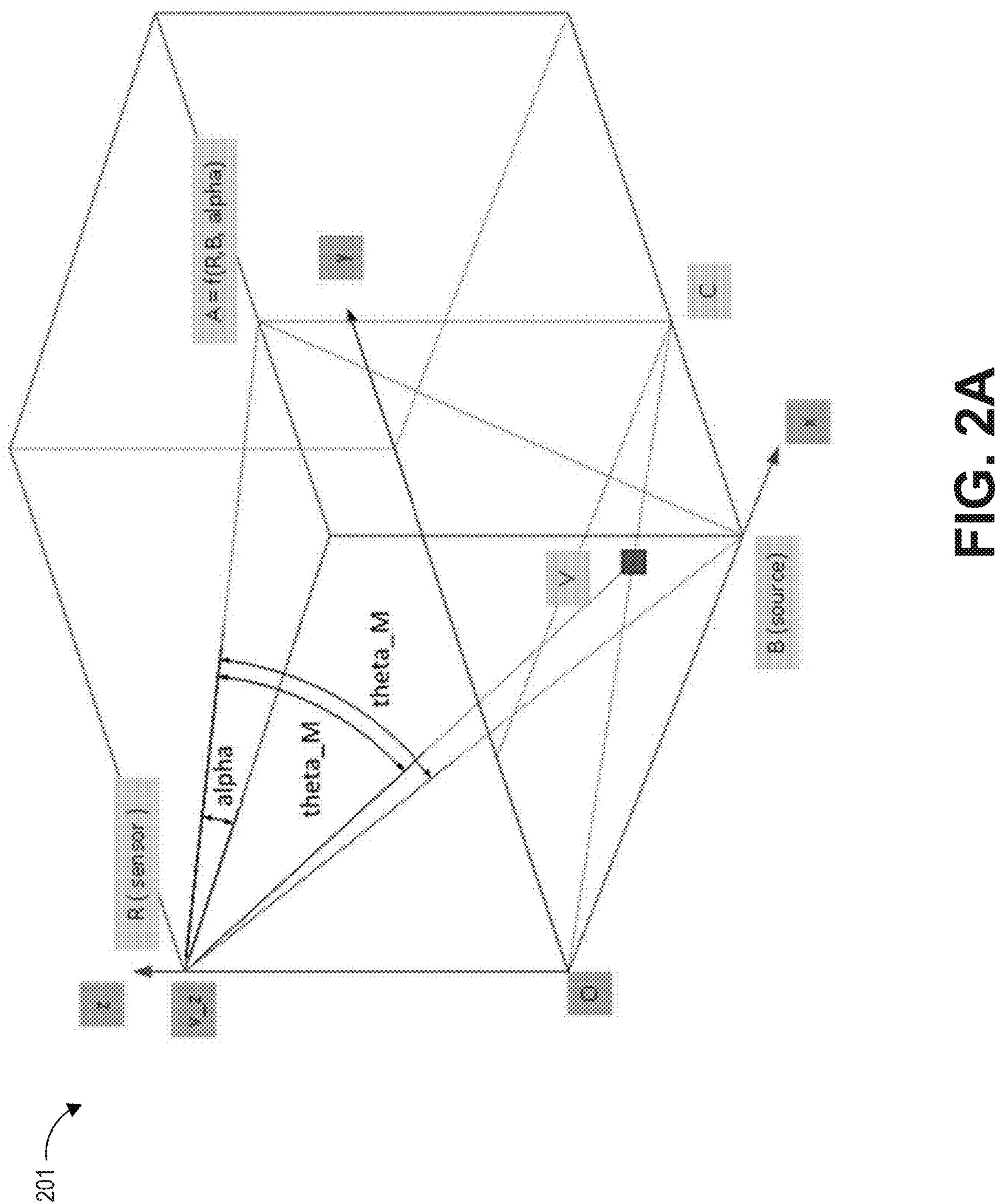
FIG. 2A illustrates an example geometric three-dimensional (3D) orientation of a sensor and source for systems and methods described herein.

FIG. 2A illustrates an example geometric three-dimensional (3D) orientation of at least some aspects of a sensor system, such as described in FIG. 1, and an RF source in an unknown location. The illustrated system includes a point of origin O with a first plane being defined by vectors x and y with a point of origin at O (can be referred to as the Oxy plane), a second plane defined by vectors x and z with a point of origin at O (can be referred to as the Oxz plane), and a third plane defined by vectors y and z with a point of origin at O (can be referred to as the Oyz plane).

In the illustrated example, the sensor system is located at point R, having coordinates (0, 0, $v_z$), right above the origin, at elevation $v_2$. The sensor system may include an antenna dipole. The dipole is in a plane parallel to Oxy, so its orientation is given by a single angle $\alpha$. When this dipole performs a measurement of a source on the ground, it measures an angle $\theta_M$ that depends on the location of the source and orientation of the dipole:

$$\theta_M = f(v_z, s, \alpha)$$

This measured angle is an angle of arrival (AoA) estimate. In this equation $s=x+jy=|s|\exp(j\theta)$ is the complex number representing the position of the source in the Oxy plane. The measured angle determines a cone in three-dimensional (3D) space, cone with axis given by the antenna dipole and angle $\theta_M$. The position of the source on the ground can then be determined as a hyperbola that is the intersection of this cone with the plane Oxy. The hyperbola is determined by 3 parameters: 1) center of the hyperbola. In this example, the origin is the center of the hyperbola. If the dipole moves to another location (x, y, $v_z$), then the center of hyperbola is (x, y, 0) or (x, y) on the ground; 2) vertex of the hyperbola. This is the point of the hyperbola that is closest to the center, and is given relative to the center. For one measurement, the vertex of the hyperbola V in the Oxy plane corresponds to a complex number given by:

$$v = \frac{v_z}{\tan\ \tan(\theta_M)}\exp(j\alpha)$$

3) the angle of the hyperbola (or angle formed by asymptotes with the axis of symmetry) that is $\theta_M$. To calculate an estimate of the position of the RF source, a second hyperbola calculated from a second set of AoA data can be compared to a first hyperbola from a first set of AoA data. For example, a controller 109 may identify a location or area of intersecting hyperbolas and a location estimate of an RF source may be associated with that intersection. A second hyperbola can be generated by moving the sensor. Where the sensor is deployed on a moving system, such as on a wing aircraft or drone, multiple measurements can be taken as the platform is in motion to obtain further sets of data. Additionally or alternatively, an antenna array of the sensor system can be rotated to obtain further sets of data. Therefore, this system can be deployed on a static or moving platform.

Additionally or alternatively, a second hyperbola can be generated by using a different sensor pair of a plurality of sensors or antennas on a sensor system. For example, a system can include three or more antennas. A first antenna or sensor pair (such as antenna A and antenna B) can be used to generate a first hyperbola and a second antenna or sensor pair (such as antenna A and antenna C) can be used to generate a second hyperbola. Further pairings can be used to generate further hyperbolas (such as using antenna B and antenna C or other pairings where there are more than three antennas). An intersection of these hyperbolas can be used to identify a location of the RF source.

Figure 2B:
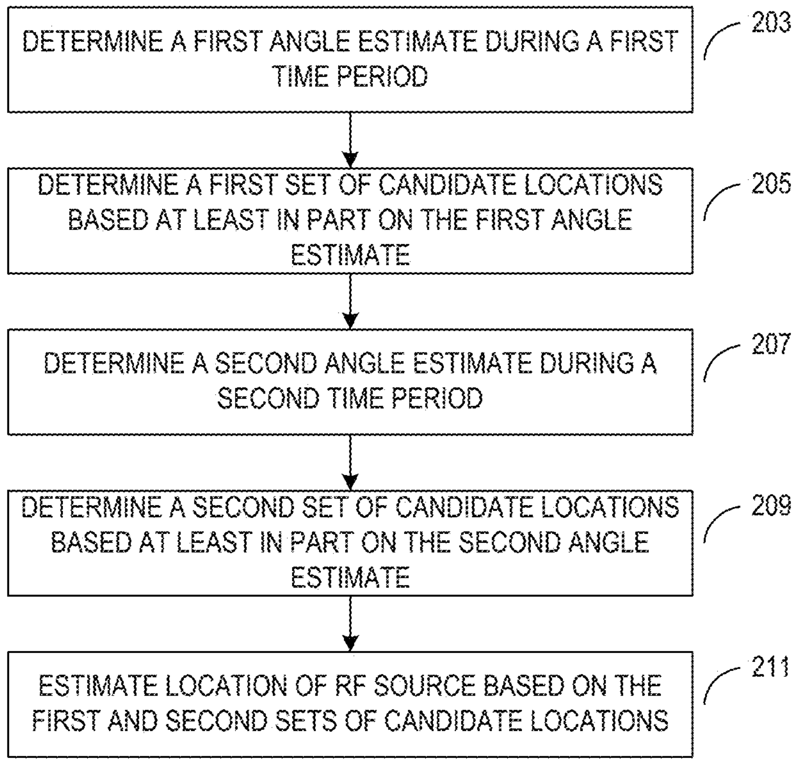
FIG. 2B illustrates an example process for determining a location estimate of a single RF source with a moving sensor system, such as described with reference to FIG. 1.

FIG. 2B illustrates an example process for determining a location estimate of a single RF source with a moving sensor system, such as described with reference to FIG. 1. As illustrated, a process can include some combination of steps, but is not limited to, the steps described herein. The process may be executed, in some examples, by a controller 109. In some examples, a controller 109 may be in communication with components of a hardware system that may include, but is not limited to two or more antennas. The two or more antennas may be configured to be coupled to a moving platform or vehicle, such as a drone or winged aircraft. Information associated with the moving platform or vehicle may be made available to the controller 109, such as the location and height of the moving platform or vehicle. The two or more antennas may include, in some examples, three antennas in a triangular configuration where each antenna is equidistant from the other two antennas (e.g. an equilateral triangle configuration). However, other configurations and other amounts of antennas are also possible. The two or more antennas may sometimes be referred to as a sensor system or an antenna grouping or array. An antenna grouping may be configured to couple to a moving platform or vehicle such that the antennas in the grouping are roughly at the same elevation and/or share a platform. In some embodiments, the sensor system may include one or more antennas, and may also include one or more other components (such as a processor, memory, or other).

With continued reference to FIG. 2B, at a step 203, a controller 109 may be configured to determine a first angle estimate during a first time period. The first angle estimate may include an estimate of an angle of arrival (AoA) at least in part by a process such as described above with reference to FIG. 2A. In some examples, a set of candidate angle estimates may be generated. A projection of the set into a plane (including but not limited to the ground plane or a plane parallel to the ground plane) may result in a curve such as a hyperbola or other. For instance, there may exist a set of angles such that if an RF source were at any of those angles, a cross correlation technique would give the same result. In some examples, a controller 109 may be configured to select two antennas of an antenna grouping associated with a moving platform or vehicle to generate the first angle estimate. The controller 109 may select the two antennas via a switching RF mechanism so that AoA measurements can be taken from a two-element antenna array. In the example of a three-antenna grouping, each antenna may be referred to as antenna 1, antenna 2, and antenna 3. A controller 109 may select a subset of the grouping to perform measurements. The array associated with the antenna groupings, such as in a three antenna system, may be referred to as array AB. To perform a measurement set on, for example, an antenna array AB, AoA measurements are performed in the A, then B antenna pair configurations, where, for example, an A configuration is associated with a configuration of antennas 1 and 2 and a B configuration is associated with a configuration of antennas 1 and 3 and so on. The first configuration is referred to as $\theta_0$ the second as $\theta_1$. At step 203, the controller 109 can generate a first angle estimate based on a cross-correlation between signals from the RF source received at each antenna in the two antenna array AB during a first time period.

At a step 205, the controller 109 can determine a first set of candidate locations based at least in part on the first angle estimate. The controller 109 may use further information, including, but not limited to a height of the antenna array (and/or platform or vehicle) and a distance between the first and second antennas of the selected antenna array to generate a first set of candidate locations for an RF source. The set of candidate locations may correspond to a first hyperbola of potential locations of the RF source, similar to the example described above with reference to FIG. 2A.

The height of the antenna array may be associated with the moving platform or vehicle and/or communicated to the controller 109 based on a location sensor 107 associated with the moving platform or vehicle. The distance between the first and second antennas may be fixed or changeable depending on the example. In some examples, the distance between the first and second antenna may be determined based on the selection of the antenna in the antenna grouping. For example, an antenna grouping may or may not include an orientation of antennas that are equidistant from each other. Thus, a selection of an antenna pair may require an update to the distance between antennas. In some examples, antennas may be equidistant from each other in an antenna grouping. Thus, the distance between antennas in an antenna array may be fixed.

With continued reference to FIG. 2B, at a step 207, the controller 109 may determine a second angle estimate based on a cross-correlation between signals from the RF source received at the first and second antennas during a second time period. The second angle estimate may include an estimate of an angle of arrival (AoA) at least in part by a process such as described above with reference to FIG. 2A and similar to that described with reference to step 201. The second time period in which the controller 109 is determining the second angle estimate may be different from the first time period. In some examples, the second time period may be a later time than the first time period. The second time period may correspond to a time after which the antenna pair, being coupled to a moving platform or vehicle, have moved. For example, a moving platform or vehicle may have moved from a first location to a second location. The controller 109 may determine a second angle estimate based on the received signals at the first location during a first time period and the second location during the second time period. Thus, two different estimates can be obtained using the same antenna pair in the same orientation with respect to each other.

At a step 209, the controller 109 may determine a second set of candidate locations based at least in part on the second angle estimate. The controller 109 may use further information, including, but not limited to a height of the antenna array (and/or platform or vehicle) and a distance between the first and second antennas of the selected antenna array to generate a first set of candidate locations for an RF source. The set of candidate locations may correspond to a second hyperbola of potential locations of the RF source, similar to the example described above with reference to FIG. 2A.

At a step 211, the controller 109 may estimate a location of an RF source based on the first and second sets of candidate locations. In some examples, the controller 109 may determine an estimated location based on an intersection of candidate locations in the first and second sets of candidate locations. The controller 109 may, in some examples, identify a location estimate based on a density of overlapping location estimates in the first and second sets of candidate locations. For example, the first and second sets of candidate locations may correspond to a first and second hyperbola of potential locations. The controller 109 may select a candidate location based on hyperbola positioning processes. In some examples, the controller 109 may select a candidate location based on a closeness, density, or amount of overlap of the hyperbolas.

In some examples, one or more of the steps may be repeated for the same or different antenna configurations or selected subsets of an antenna grouping at further time periods or points in time where the moving platform or vehicle moves. Additionally or alternatively, the process described herein may be combined with any other process to help identify and track at least one RF source. For example, if a moving or movable platform or vehicle is not moving or stops moving, a controller 109 may switch to a process to identify an RF source using a static sensor system, such as described below.

Figure 2C:
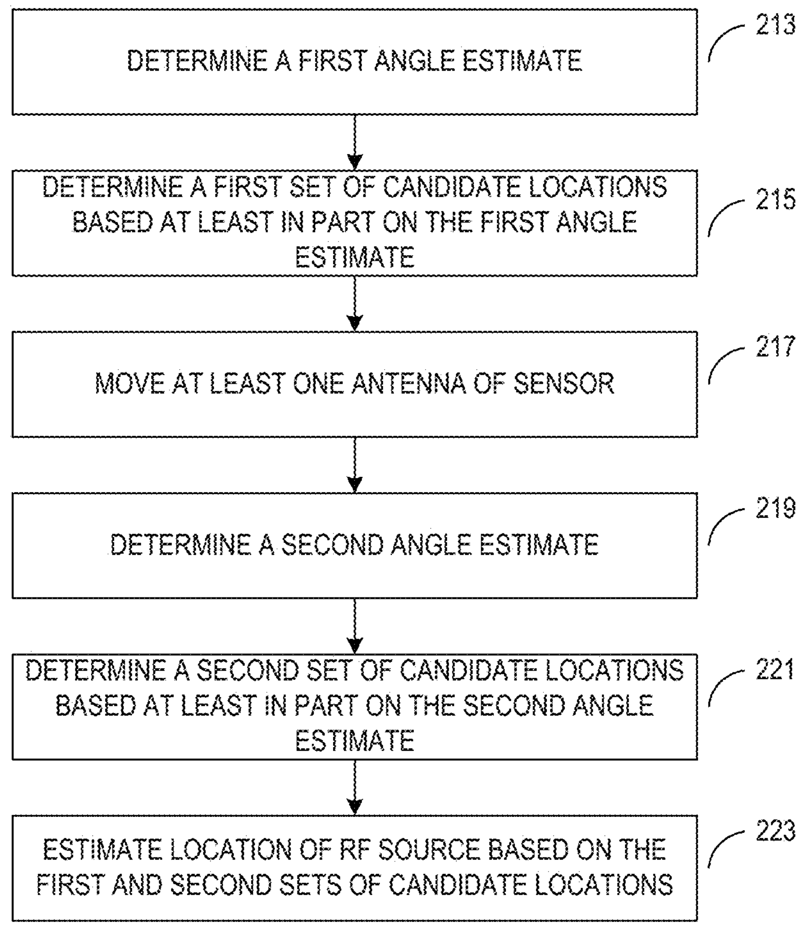
FIG. 2C illustrates an example process for determining a location estimate of a single RF source with a stationary sensor system, such as described with reference to FIG. 1.

FIG. 2C illustrates an example process for determining a location estimate of a single RF source with a stationary sensor system, such as described with reference to FIG. 1. illustrates an example process for determining a location estimate of a single RF source with a static sensor system, such as described with reference to FIG. 1. As illustrated, a process can include some combination of steps, but is not limited to, the steps described herein. The process may be executed, in some examples, by a controller 109. In some examples, a controller 109 may be in communication with components of a hardware system that may include, but is not limited to two or more antennas. The two or more antennas may be configured to be coupled to a platform or vehicle, such as a drone or winged aircraft, that may or may not be moving. The process described in FIG. 2C does not depend on the platform or vehicle being in motion. Information associated with the platform or vehicle may be made available to the controller 109, such as the location and height of the platform or vehicle. The two or more antennas may include, in some examples, three antennas in a triangular configuration where each antenna is equidistant from the other two antennas (e.g. an equilateral triangle configuration). However, other configurations and other amounts of antennas are also possible. The two or more antennas may sometimes be referred to as a sensor system or an antenna grouping or array. An antenna grouping may be configured to couple to a platform or vehicle such that the antennas in the grouping are roughly at the same elevation and/or share a platform.

At a step 213, a controller 109 may determine a first angle estimate. The controller 109 may determine a first angle estimate in a manner similar to that described above with reference to at least step 203 of FIG. 2B. In some examples, the antenna pair being used in step 213 may be a subset of a grouping of three or more antennas.

At a step 215, the controller 109 may determine a first set of candidate locations based at least in part on the first angle estimate. The controller 109 may use further information, including, but not limited to a height of the antenna array (and/or platform or vehicle) and a distance between the first and second antennas of the selected antenna array to generate a first set of candidate locations for an RF source. The set of candidate locations may correspond to a first hyperbola of potential locations of the RF source, similar to the example described above with reference to FIG. 2A. In some examples, a set of candidate locations projected onto a plane may form the hyperbola discussed herein. However, other projections and forms or shapes projected onto the plane may also be possible.

The height of the antenna array may be associated with the platform or vehicle and/or communicated to the controller 109 based on a location sensor 107 associated with the moving platform or vehicle. The distance between the first and second antennas may be fixed or changeable depending on the example. In some examples, the distance between the first and second antenna may be determined based on the selection of the antenna in the antenna grouping. For example, an antenna grouping may or may not include an orientation of antennas that are equidistant from each other. Thus, a selection of an antenna pair may require an update to the distance between antennas. In some examples, antennas may be equidistant from each other in an antenna grouping. Thus, the distance between antennas in an antenna array may be fixed.

With continued reference to FIG. 2C, at a step 217, a controller 109 may cause an actuator 103 coupled to the antenna pair to move at least one antenna of the sensor system. The actuator 103 may be configured to rotate the antenna pair a certain number of degrees, such as 20, 45, 90, and 125 degrees or a different amount of rotation with respect to an initial position. The angle of rotation may be selected to be sufficient enough to provide a different cross-correlation between signals to allow for a second angle estimate. Additionally or alternatively, the controller 109 may be configured to select a different subset of the antenna grouping such that there is a different cross-correlation between signals that allows for a second angle estimate.

At a step 219, the controller 109 may be configured to determine a second angle estimate. The controller 109 may determine the second angle estimate in a manner similar to that described above with reference to at least step 203 of FIG. 2B or step 213.

At a step 221, the controller 109 may be configured to determine a second set of candidate locations based at least in part on the second angle estimate. The controller 109 may use further information, including, but not limited to a height of the antenna array (and/or platform or vehicle) and a distance between the first and second antennas of the selected antenna array to generate a first set of candidate locations for an RF source. The set of candidate locations may correspond to a second hyperbola of potential locations of the RF source, similar to the example described above with reference to FIG. 2A.

At a step 223, the controller 109 may estimate a location of an RF source based on the first and second sets of candidate locations. In some examples, the controller 109 may determine an estimated location based on an intersection of candidate locations in the first and second sets of candidate locations. The controller 109 may, in some examples, identify a location estimate based on a density of overlapping location estimates in the first and second sets of candidate locations. For example, the first and second sets of candidate locations may correspond to a first and second hyperbola of potential locations. The controller 109 may select a candidate location based on hyperbola positioning processes. In some examples, the controller 109 may select a candidate location based on a closeness, density, or amount of overlap of the hyperbolas. In some examples, a candidate location may be at or near an intersection point of hyperbolas associated with the projections of the first and second sets of candidate locations onto a plane. A selected candidate location may or may not be in the first and/or second sets of candidate locations.

FIGS. 3A-3D illustrate example hyperbola projections at different angles of orientation of a rotating sensor pair, such as described above with reference to FIG. 2C. A source position 301 is estimated with hyperbolas intersecting before and after the antenna array is rotated at 20, 45, 90 and 125 degrees is illustrated in FIGS. 3A, 3B, 3C, and 3D respectively. The areas of intersection of the first and second hyperbolas at locations 303A, 303B for a 20 degree rotation and 305A and 305B at a 45 degree rotation, in this example, indicate a denser area of intersection or an area where both hyperbolas are closer to each other or overlapping and therefore a higher likelihood of an RF source being in that location. As illustrated, while an intersection between hyperbolas may exist, the lack of density of intersection or lack of area where the hyperbolas are sufficiently close in areas 307A, 307B for a 90 degree rotation and at 309A, 209B for a 125 degree rotation, may result in a less accurate estimate. In some examples, a controller 109 may not select a candidate location unless a confidence measure is reached or exceeded, such as a threshold closeness of overlap between the first and second hyperbolas near the point of intersection. In some examples, a controller 109 may perform a fit, such as a Gaussian fitting of estimates. The fit may help facilitate selection of a candidate location.

Figure 4:
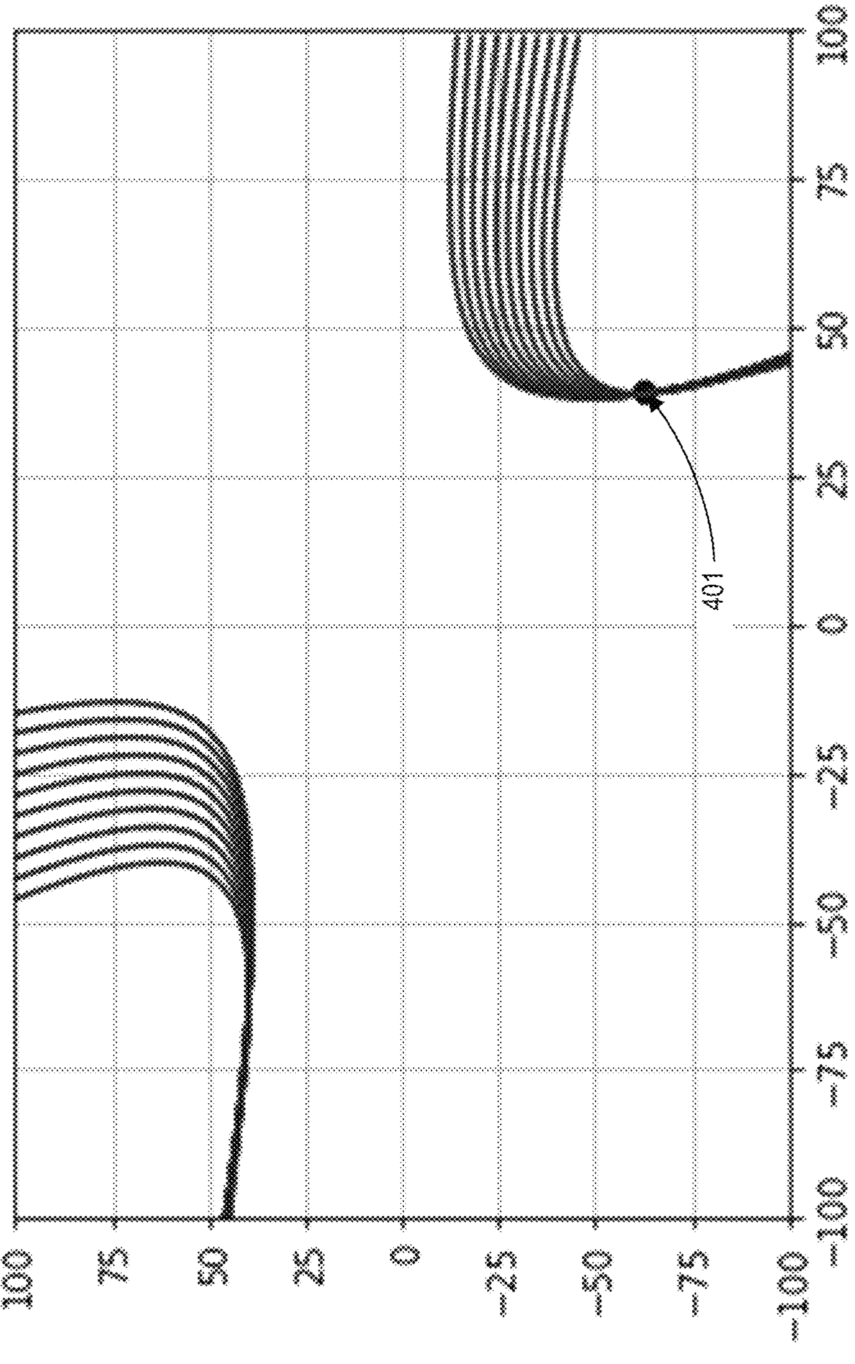
FIG. 4 illustrates an example of moving platform hyperbola projections.

FIG. 4 illustrates an example of moving platform hyperbola projections. In the case of a moving platform, a sensor system can be configured to generate a plurality of angle estimates at a plurality of times as the platform is moving. The plurality of angle estimates may generate a plurality of sets of candidate locations. The sets of candidate locations when plotted may correspond to a plurality of hyperbolas, such as illustrated in FIG. 4. An overlapping portion 401 of the plurality of hyperbolas may correspond to an RF source location.

Identification of a Plurality of RF Sources

Figure 5:
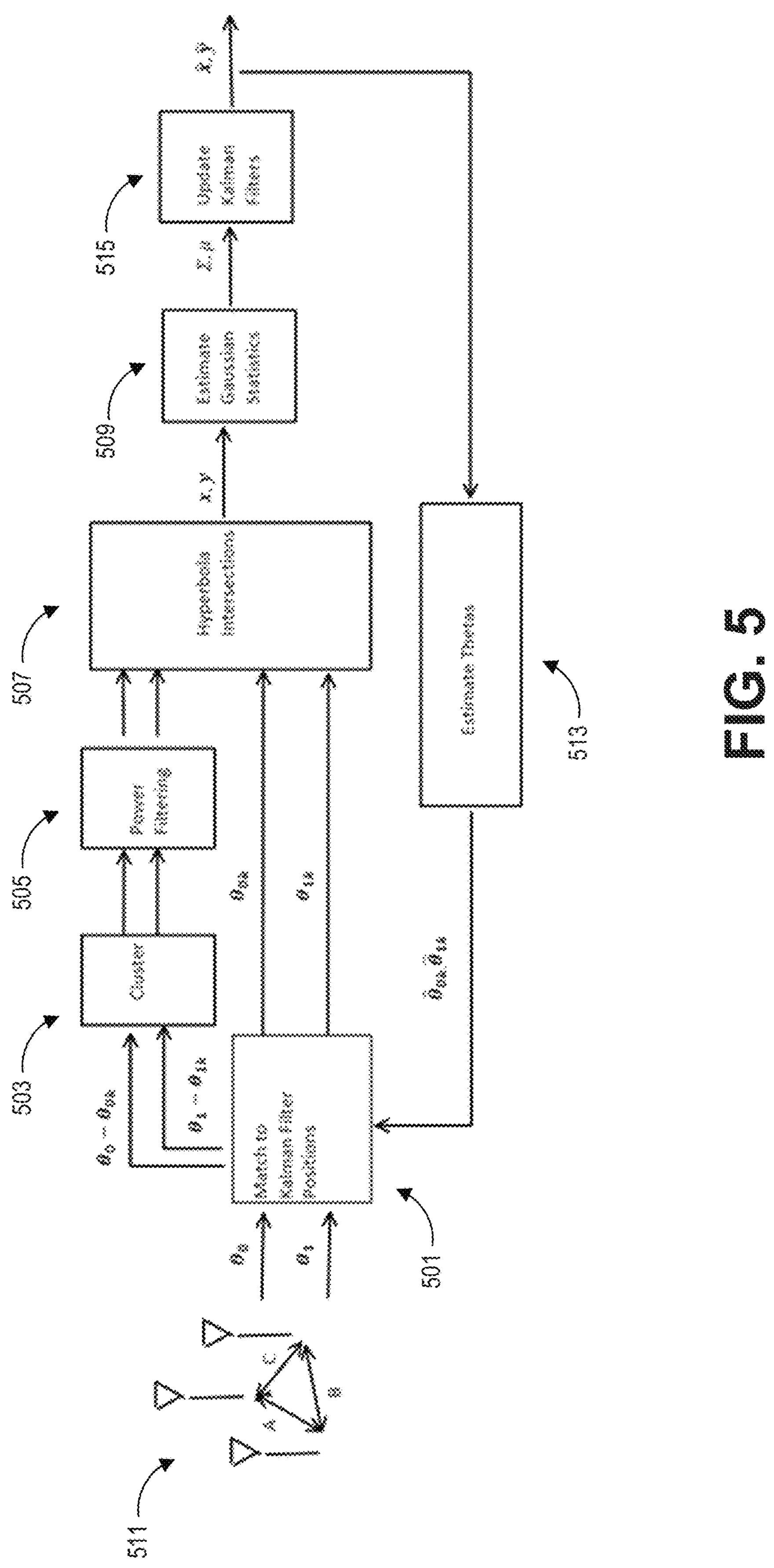
FIG. 5 illustrates a block diagram of an example process for identifying and locating multiple RF sources with a sensor system, such as described with reference to FIG. 1.

FIG. 5 illustrates a block diagram of an example process for identifying and locating multiple RF sources with a sensor system, such as described with reference to FIG. 1. As illustrated a process can processing signals received at a sensor system 511. The process may include, but is not limited to, a Kalman filter block 501, a clustering block 503, a power filtering block 505, a hyperbola intersection block 507, a gaussian estimation block 509, a Kalman filter update block 511, and an angle estimation block 513.

Figure 6A:
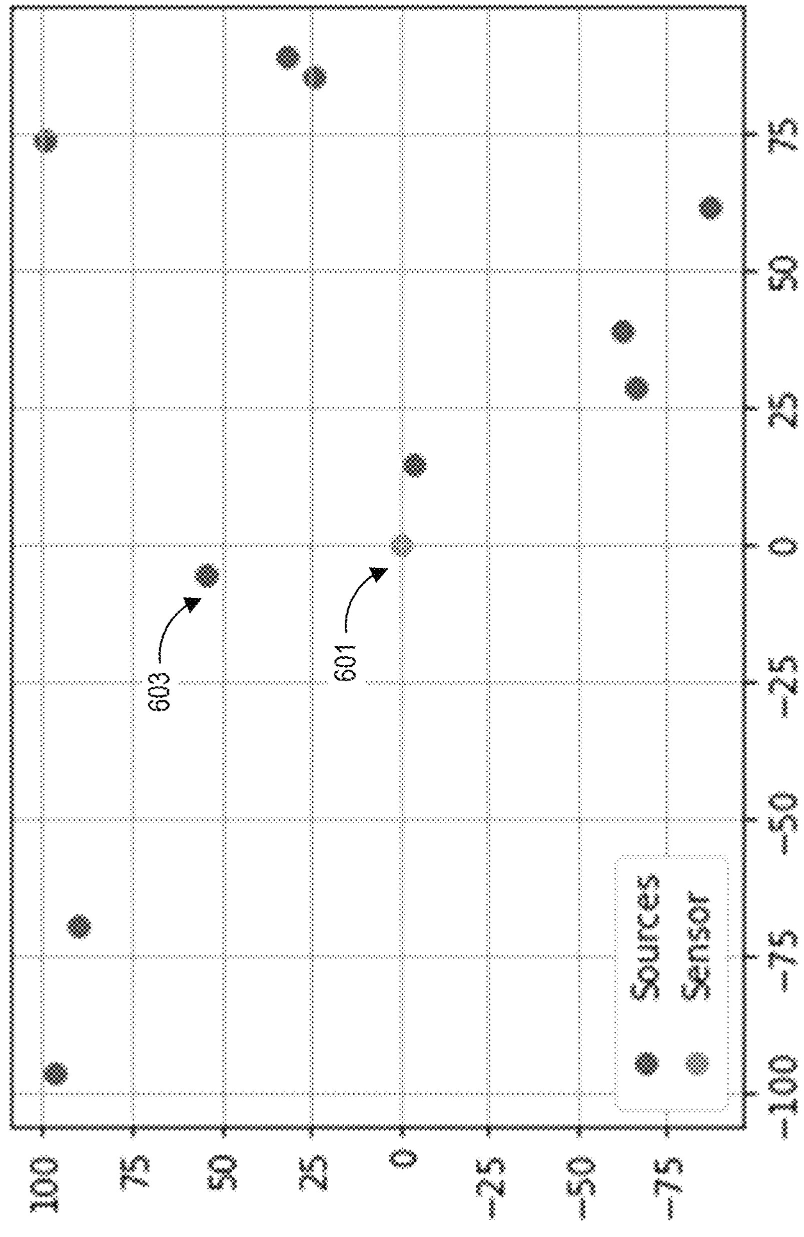
FIG. 6A illustrates an example positioning in two-dimensional (2D) space of an example set of multiple RF source.

A sensor system 511 may include, for example, a plurality of antennas. In the illustrated example, the sensor system 511 includes three antennas A, B, and C. A controller 109 may obtain a set of AoA estimates from two or more antenna pairs (such as AB, BC, and/or AC) to generate at least two sets of angle estimates for one or more signals received at the sensor system. The one or more signals may be associated with one or more transmitting RF sources in the environment of the sensor system at one or more unknown locations. FIG. 6A illustrates an example of a plurality of RF sources 603 in the presence of a sensor system 601 when projected onto a ground plane. In the illustrated example, a controller 109 may generate two sets of angle estimates, θ0 and θ1 for the one or more RF sources 603. Assuming multiple RF sources on a ground plane, such as shown in FIG. 6A, an AOA estimate can be calculated if the height of the sensor above ground is known.

The Kalman filter, at block 501, can identify or match candidate RF sources based on a previous set of angle estimates ($\hat{\theta}$0k and $\hat{\theta}$1k as illustrated in FIG. 5), where a pervious angle estimate is an angle of a calculated hyperbola for an identified RF source, such as described above with reference to FIGS. 2A-2C. It is of note that while Kalman filtering is disclosed herein, other types of matching or filtering may also be possible. An output of the Kalman filtering block 501 may include filtered observations from the sensor system 511. Filtered observations may correspond to a comparison of the new set of angle estimates with the previous set of angle estimates (θ0-$\hat{\theta}$0k and θ1-$\hat{\theta}$1k in the illustrated example). This comparison and/or output may result in a set of angle estimates corresponding to just newly observed RF sources. Advantageously, this allows for more efficient identification of RF sources and RF source locations.

Figure 6B:
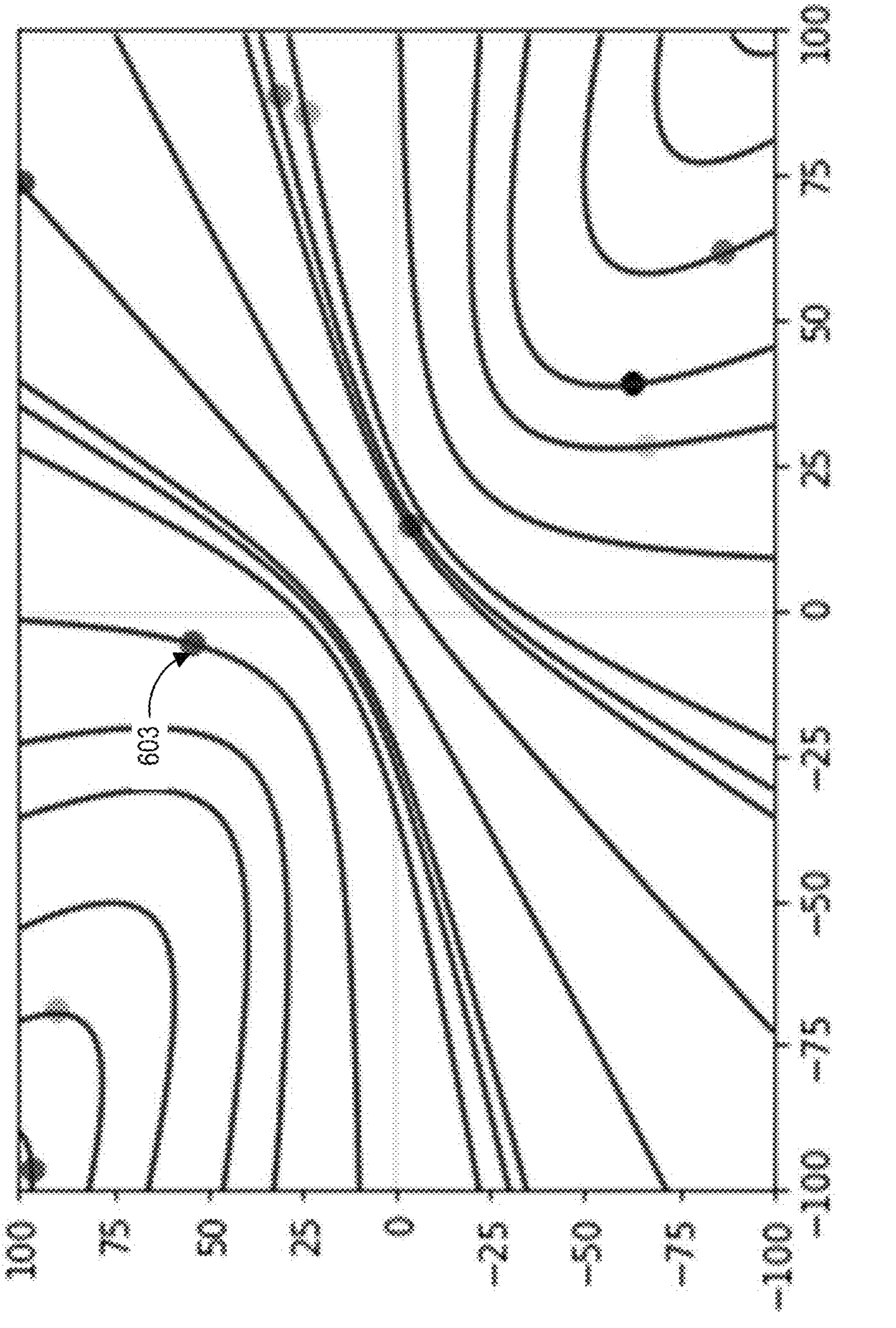
FIG. 6B illustrates an example of hyperbola projections for the multiple RF sources of FIG. 6A.

In an initial state, no RF sources were previously detected so the observations from sensor system 511 may bypass the Kalman Matching functionality at block 501 and are processed in the clustering and power filtering branch at blocks 503 and 505 respectively. The result of these processing steps determines the number of RF sources not being tracked and assigns AoA observations to clusters so that hyperbola positioning can be performed at steps 507 and 509 using intra cluster processing, such as described above with reference, for example, to FIGS. 2A-2C. A hyperbola projection of possible positions of at least some RF sources 603 shown in FIG. 6A is illustrated in FIG. 6B.

Figure 7A:
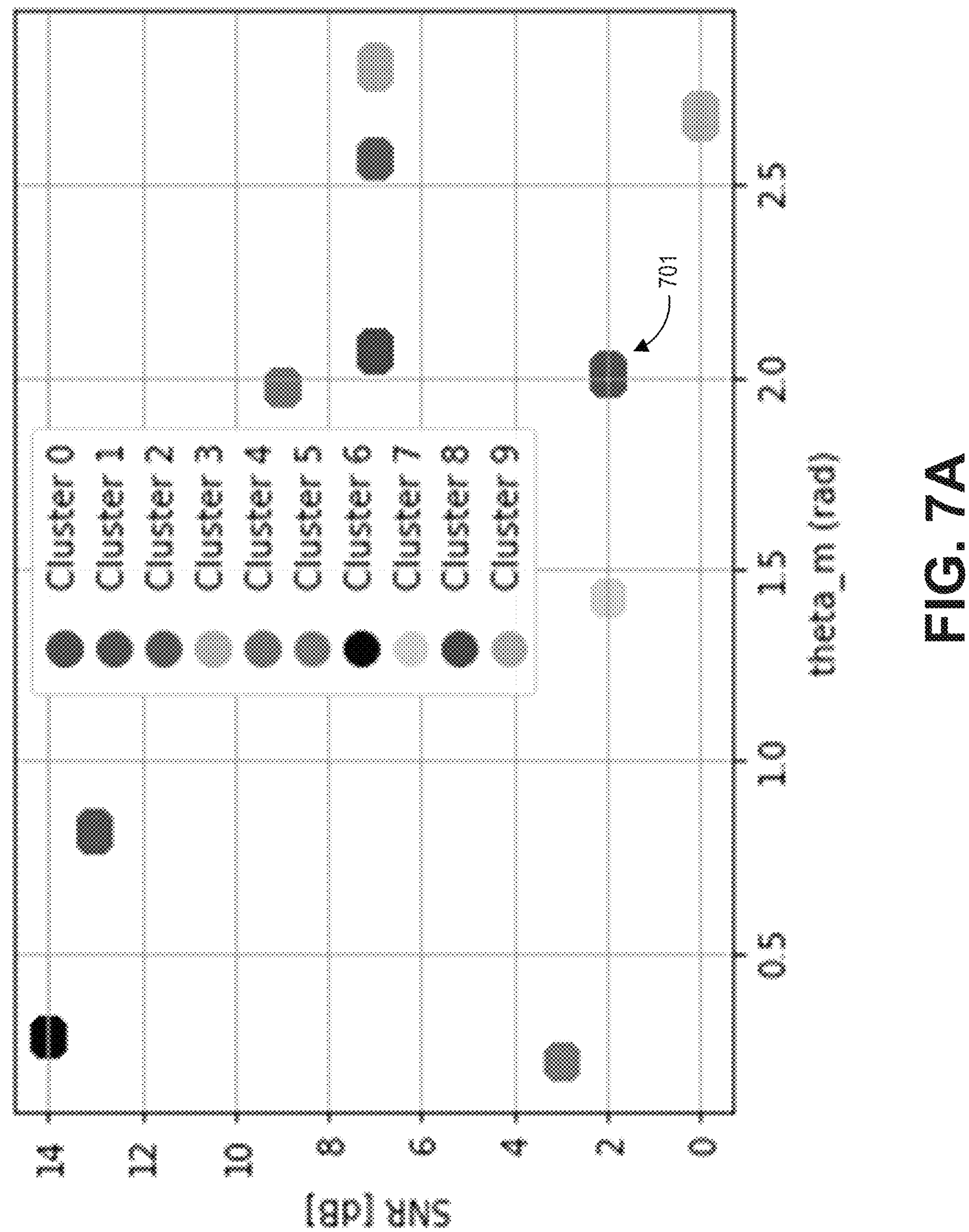
FIG. 7A illustrates an example of cluster estimates in terms of power and angle for the multiple RF sources of FIG. 6A.

At a clustering block 503, a controller 109 may cluster the observations by angle. These clusters may be mapped based on power associated with each cluster at power filtering block 505. An example mapping of clusters 701 by received power and angle is illustrated in FIG. 7A. Each distinct cluster on the map may be associated with a different RF source. Advantageously, organizing the AoA estimates in this way can allow for distinction of different RF sources having similar AoA estimates. For example, filtering by power can allow a controller 109 to distinguish between the three clusters having a θm of approximately 2 radians in FIG. 7A. As is illustrated, the three clusters have distinct SNRs (signal to noise ratios) of approximately 2.7, and 9 dB. Without the power filtering, at least two of these RF sources might be otherwise missed. It is of note that various other features of the signal may be used to filter or map the data of which power and AoA is an example.

In some embodiments, power filtering may be used to track RF sources, detect new RF sources, and/or differentiate RF sources. Consider a non-limiting example, in which the sensor performs a first RF sensing of the environment (using one or more operations described herein). In the first RF sensing, the sensor may determine a first grouping that includes two clusters, the first cluster at an average power level P1 and angle theta_1, the second cluster at an average power level P2 and angle theta_2. The sensor may perform a second RF sensing in accordance with one or more of the following with respect to the first RF sensing: performed at a later time, performed with a different antenna orientation, performed with the same antenna orientation, performed at a different location (i.e. the sensor may be mobile), performed at the same location, and/or other. In the second RF sensing, outcomes such as the following are possible. If there are more than two clusters, the sensor may determine that a new RF source has been detected. If there are less than two clusters, the sensor may determine that one of the previously detected RF sources is inactive. If there are two clusters, the sensor may determine if they correspond to the clusters from the first RF sensing by using received powers. For instance, if the second RF sensing produces two clusters with power levels similar to P1 and P2, but perhaps at different angles, then the sensor may decide that the two clusters of the second RF sensing correspond to the two clusters of the first RF sensing.

Figure 7B:
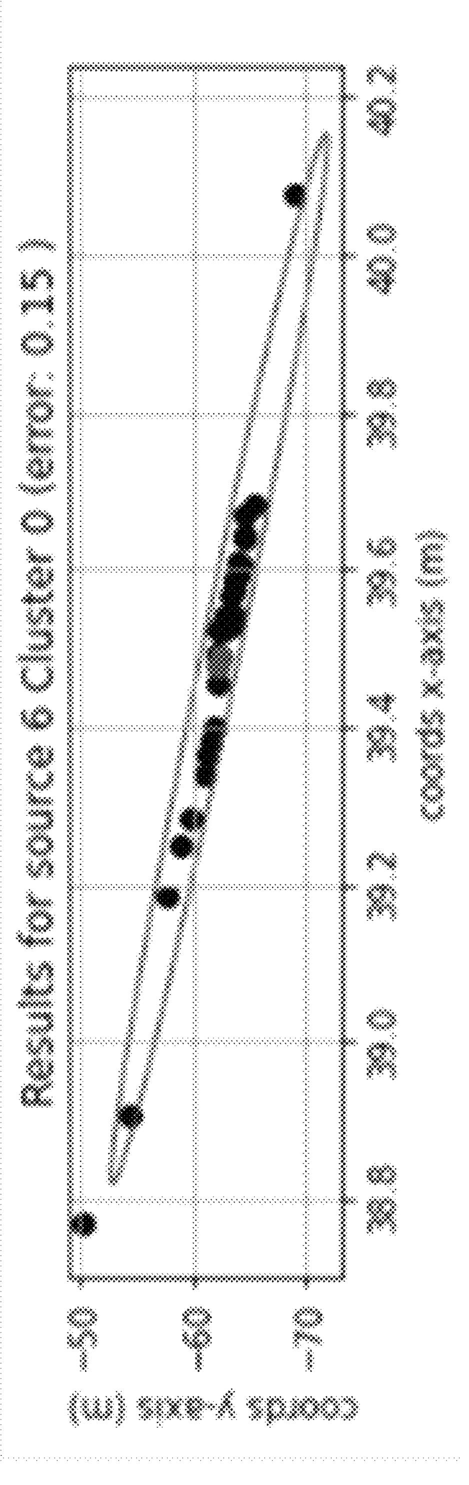
FIG. 7B illustrates an example of a location estimate of an RF source for an identified cluster.

At a hyperbola intersections block 507, a controller 109 can determine a location estimate based on intersections of the hyperbolas associated with each cluster that may be, for example, the output of the power filtering block 505. The location estimate may be performed in a manner such as described above with reference, for example, to FIGS. 2A-2C. In a non-limiting example, the controller may apply a Gaussian fitting of the location estimates at block 509. An output of the Gaussian fitting may include, for example, a probability distribution, mean location, and/or a confidence interval. FIG. 7B illustrates an example of a location distribution and/or set of estimates for an example cluster. A mean and/or error associated with the distribution may be generated using Gaussian fitting as described herein. As illustrated in FIG. 7B, a confidence ellipse associated with the candidate locations may be generated based on the Gaussian fitting. It is also noted that embodiments are not limited to usage of Gaussian fitting, as other fittings or other techniques may also be used.

The result of the processing chain, such as the output of the hyperbola intersections block 507 and/or Gaussian estimates block 509 may be passed into update block 515. The controller 109 can thus seed or update Kalman Filters that track discovered sources at block 507.

To perform simultaneous tracking and discovery, the next antenna configurations for sensor system 511 are selected. For example, BC configurations may used if an AB and/or AC configuration was previously used. Since BC will result in a new dipole orientation of the sensor system 511, the positions of the tracked RF sources and information about the dipole orientation are used to determine the AoA of known sources at block 513. This generates a set of AoA estimates that the controller 109 can use to classify the incoming AoA measurements to determine which measurements come from sources already tracked and which come from new sources that need to be processed. Performing this classification step on new AoA data allows existing source estimates to be updated and new ones to be used to discover new RF sources in the same iteration of the algorithm. The controller 109 can keep iterating through the antenna configurations AB, BC, AC and either discovering new sources or updating and tracking existing sources.

Once processed the intersections of hyperbolas for each source can be projected onto a 2D plane with coordinates relative to the sensor. Multiple measurements enable statistics to be estimated for use in various prediction algorithms such as Kalman and particle filters.

Additional Aspects

Disclosed herein are additional examples of one or more aspects of the systems and methods disclosed. Any of the aspects or examples disclosed may be combined in whole or in part. In some examples, a system may perform a method described herein. Some examples may include a method of operating or interacting with at least some aspects of a system, such as one or more hardware processors and/or antennas. Any of the examples disclosed herein may be used as part of a system to output information to a user and/or computer interface.

Example 1: A system for determining the location of a radio frequency (RF) source, the system comprising: a sensor system comprising: a first antenna configured to receive a signal from the RF source; a second antenna configured to receive the signal from the RF source; one or more hardware processors in communication with the sensor system, the one or more hardware processors configured to: receive, at a first time, a first signal from the RF source at the first antenna; receive, at the first time, a second signal from the RF source at the second antenna; generate a first angle estimate based on a cross-correlation between the first signal and the second signal, the first angle estimate comprising an estimate of an angle between the sensor system and the RF source; determine a first set of candidate locations of the RF source based at least in part on the first angle estimate; receive, at a second time, a third signal from the RF source at the first antenna; receive, at the second time, a fourth signal from the RF source at the second antenna; generate a second angle estimate based on a cross-correlation between the third and fourth signal, the second angle estimate comprising an estimate of an angle between the sensor system and the RF source; determine a second set of candidate locations of the RF source based at least in part on the second angle estimate; and estimate a location of the RF source based on the first set of candidate locations and the second set of candidate locations.

Example 2: The system of example 1, wherein the one or more hardware processors is configured to determine the first set of candidate locations based further on at least one parameter associated with the sensor system.

Example 3: The system of example 2, wherein a height of the sensor system and a distance between the first and second antennas.

Example 4: The system of example 1, wherein the first signal and the second signal are emitted by the RF source at the same time.

Example 5: The system of example 1, wherein the third signal and the fourth signal are emitted by the RF source at the same time and at a time that is different from the emission of the first signal and the second signal.

Example 6: The system of example 1, wherein the first or second set of candidate locations comprises a hyperbola.

Example 7: The system of example 1, wherein the first and second sets of candidate locations comprise a first and second hyperbola when plotted in a ground plane associated with the RF source or sensor system.

Example 8: The system of example 1, wherein the one or more hardware processors are configured to cause the first antenna or second antenna to move between the first and second times.

Example 9: The system of example 8, wherein the one or more hardware processors are configured to cause a change in orientation of the first and second antenna between the first and second times.

Example 10: The system of example 8, wherein the one or more hardware processors are configured to cause the first and second antenna to rotate around a central point between the first and second antenna between the first and second times.

Example 11: The system of example 10, wherein the one or more hardware processors are configured to cause the first and second antennas to rotate at least 20 degrees from an initial orientation.

Example 12: The system of example 10, wherein the one or more hardware processors are configured to cause the first and second antennas to rotate at least 45 degrees from an initial orientation.

Example 13: The system of example 10, wherein the one or more hardware processors are configured to cause the first and second antennas to rotate at least 90 degrees from an initial orientation.

Example 14: The system of example 10, wherein the one or more hardware processors are configured to cause the first and second antennas to rotate at least 125 degrees from an initial orientation.

Example 15: The system of example 1, wherein the sensor system is stationary between the first and second time.

Example 16: The system of example 15, wherein the one or more hardware processors are configured to identify that the sensor system is stationary and cause the first and second antennas to rotate based on the identification that the sensor system is stationary.

Example 17: The system of example 16, wherein the one or more hardware processors is configured to determine that the sensor system is stationary if the sensor system moves its physical location less than a threshold amount.

Example 18: The system of example 1, wherein the sensor system is in motion between the first and second times.

Example 19: The system of example 18, wherein the one or more hardware processors are configured to identify that the sensor system is in motion and cause the first and second antennas to remain in an initial orientation based on the identification that the sensor system is in motion.

Example 20: The system of example 1, wherein the one or more hardware processors are configured to identify more than one RF source.

Example 21: The system of example 20, wherein the one or more hardware processors are configured to determine additional angle estimates based on additional received signals at the first or second times and identify additional RF sources based on the additional angle estimates.

Example 22: The system of example 20, wherein the one or more hardware processors are configured to map a plurality of angle estimates based on a plurality of received signals at the first and second antennas into a cluster map, wherein each cluster in the cluster map corresponds to a different RF source.

Example 23: The system of example 22, wherein the cluster map comprises an angle estimate plotted against power for the received signals.

Example 24: The system of example 22, wherein the one or more hardware processors are configured to identify a location estimate for each cluster in the cluster map.

Example 25: The system of example 20, wherein the one or more hardware processors are configured to identify a corresponding power for each angle estimate and identify at least one RF source based at least in part on the corresponding power.

Example 26: A system for identifying at least one RF source, the system comprising: one or more hardware processors, the one or more hardware processors configured to: generate a first set of candidate locations for the RF source based at least in part on a cross correlation of signals received at a first antenna and a second antenna of a sensor system at a single location, the first antenna and second antenna being in a first orientation;

move the first antenna and the second antenna from the first orientation into a second orientation; generate a second set of candidate locations for the RF source based at least in part on a cross correlation of received signals at the first antenna and the second antenna of the sensor system at the single location, the first antenna and second antenna being in the second orientation; estimate a location of the RF source based on the first set of candidate locations and the second set of candidate locations.

Example 27: The system of example 26, wherein moving the first antenna and the second antenna from the first orientation into the second orientation comprises rotating at least one of the first antenna or the second antenna around a point associated with the sensor system.

Example 28: The system of example 27, wherein the one or more hardware processors are configured to cause the first and second antennas to rotate at least 20 degrees from an initial orientation.

Example 29: The system of example 27, wherein the one or more hardware processors are configured to cause the first and second antennas to rotate at least 45 degrees from an initial orientation.

Example 30: The system of example 27, wherein the one or more hardware processors are configured to cause the first and second antennas to rotate at least 90 degrees from an initial orientation.

Example 31: The system of example 27, wherein the one or more hardware processors are configured to cause the first and second antennas to rotate at least 125 degrees from an initial orientation.

Example 32: A system for identifying at least one RF source, the system comprising: one or more hardware processors, the one or more hardware processors configured to: generate a first set of candidate locations for the RF source based at least in part on a cross correlation of signals received at a first antenna and a second antenna of a sensor system at a first location; generate a second set of candidate locations for the RF source based at least in part on a cross correlation of received signals at the first antenna and the second antenna of the sensor system at a second location different from the first location; estimate a location of the RF source based on the first set of candidate locations and the second set of candidate locations.

Example 33: The system of example 32, wherein the sensor system is configured to be coupled to a moving vehicle.

Example 34: The system of example 33, wherein the moving vehicle is a winged aircraft or a drone.

Example 35: A system for identifying at least one RF source, the system comprising: one or more hardware processors, the one or more hardware processors configured to: generate a first set of candidate locations for the RF source based at least in part on a cross correlation of signals received at a first antenna pair of a sensor system at a single location, wherein the sensor system comprises three or more antennas; generate a second set of candidate locations for the RF source based at least in part on a cross correlation of received signals at a second antenna pair of the sensor system at the single location, the second antenna pair comprising a different subset of antennas of the three or more antennas than the first antenna pair; estimate a location of the RF source based on the first set of candidate locations and the second set of candidate locations.

Example 36: The system of example 35, wherein the sensor system comprises three antennas in an equilateral triangle configuration.

Example 37: The system of example 35, wherein a distance between antennas in the first antenna pair is the same as the distance between antennas in the second antenna pair.

Example 38: A system for determining a location of at least one RF source, the system comprising: a sensor system comprising a plurality of antennas at a same or nearby location, the plurality of antennas configured to receive signals from a plurality of RF sources; and one or more hardware processors in communication with the sensor system, the one or more hardware processors configured to: generate a first set of angle estimates based at least in part on a cross correlation of signals received at a first antenna and a second antenna of the plurality of antennas; analyze the first set of angle estimates to determine a first set of clusters, each cluster comprising one or more angles of the first set of angle estimates; determine a received power for each cluster of the first set clusters; generate a second set of angle estimates based at least in part on a cross correlation of signals received at the first antenna and a third antenna of the plurality of antennas; analyze the second set of angle estimates to determine a second set of clusters, each cluster comprising one or more angles of the second set of angle estimates; determine a received power for each cluster of the second set clusters; determine a mapping between the first set of clusters and the second set of clusters based at least in part on a comparison of the received powers of the first set of clusters and the received powers of the second set of clusters; and identify a location of at least one RF source based at least in part on the mapping.

Example 39: The system of example 38, wherein the one or more hardware processors is configured to determine whether any clusters are new based on a comparison with a previous mapping.

Example 40: The system of example 39 wherein to determine whether any clusters are new, the one or more hardware processors are configured to apply a Kalman filter to the mapping.

Example 41: The system of example 40, wherein the one or more hardware processors are configured to update the Kalman filter in response to determining that there is at least one new cluster.

Example 42: The system of example 38, wherein the one or more hardware processors are configured to assign each cluster of the first set of clusters or the second set of clusters to an RF source.

Example 43: The system of example 38, wherein the one or more hardware processors are configured to:

generate a third set of angle estimates based at least in part on a cross correlation of signals received at the second antenna and the third antenna of the plurality of antennas;

analyze the third set of angle estimates to determine a third set of clusters, each cluster comprising one or more angles of the third set of angle estimates; and determine a received power for each cluster of the third set of clusters.

Example 44: The system of example 43 wherein the one or more hardware processors are configured to determine the mapping based at least in part on the third set of clusters.

Example 45: A method for determining the location of a radio frequency (RF) source, the method comprising: Receiving, at a first time, a first signal from the RF source at a first antenna of a sensor system; receiving, at the first time, a second signal from the RF source at a second antenna of the sensor system; generating a first angle estimate based on a cross-correlation between the first signal and the second signal, the first angle estimate comprising an estimate of an angle between the sensor system and the RF source; determining a first set of candidate locations of the RF source based at least in part on the first angle estimate; receiving, at a second time, a third signal from the RF source at the first antenna; receiving, at the second time, a fourth signal from the RF source at the second antenna; generating a second angle estimate based on a cross-correlation between the third and fourth signal, the second angle estimate comprising an estimate of an angle between the sensor system and the RF source; determining a second set of candidate locations of the RF source based at least in part on the second angle estimate; and estimating a location of the RF source based on the first set of candidate locations and the second set of candidate locations.

Example 46: The method of example 45, wherein the location of the first antenna and second antenna is the same or nearby with respect to the RF source.

Example 47: The method of example 45, wherein determining the first set of candidate locations is based further on at least one parameter associated with the sensor system.

Example 48: The method of example 47, wherein a height of the sensor system and a distance between the first and second antennas.

Example 49: The method of example 45, wherein the first signal and the second signal are emitted by the RF source at the same time.

Example 50: The method of example 45, wherein the third signal and the fourth signal are emitted by the RF source at the same time and at a time that is different from the emission of the first signal and the second signal.

Example 51: The method of example 45, wherein the first or second set of candidate locations comprises a hyperbola.

Example 52: The method of example 45, wherein the first and second sets of candidate locations comprise a first and second hyperbola when plotted in a ground plane associated with the RF source or sensor system.

Example 53: The method of example 45, further comprising causing the first antenna or second antenna to move between the first and second times.

Example 54: The method of example 53, further comprising causing a change in orientation of the first and second antenna between the first and second times.

Example 55: The method of example 53, further comprising causing the first and second antenna to rotate around a central point between the first and second antenna between the first and second times.

Example 56: The method of example 55, further comprising causing the first and second antennas to rotate at least 20 degrees from an initial orientation.

Example 57: The method of example 55, further comprising causing the first and second antennas to rotate at least 45 degrees from an initial orientation.

Example 58: The method of example 55, further comprising causing the first and second antennas to rotate at least 90 degrees from an initial orientation.

Example 59: The method of example 55, further comprising causing the first and second antennas to rotate at least 125 degrees from an initial orientation.

Example 60: The method of example 45, wherein the sensor system is stationary between the first and second time.

Example 61: The method of example 60, comprising determining that the sensor system is stationary and causing the first and second antennas to rotate based on the identification that the sensor system is stationary.

Example 62: The method of example 61 comprising determining that the sensor system is stationary if the sensor system moves its physical location less than a threshold amount.

Example 63: The method of example 45, wherein the sensor system is in motion between the first and second times.

Example 64: The method of example 63, comprising identifying that the sensor system is in motion and cause the first and second antennas to remain in an initial orientation based on the identification that the sensor system is in motion.

Example 65: The method of example 45, comprising identifying more than one RF source.

Example 66: The method of example 65, comprising determining additional angle estimates based on additional received signals at the first or second times and identifying additional RF sources based on the additional angle estimates.

Example 67: The method of example 65, comprising mapping a plurality of angle estimates based on a plurality of received signals at the first and second antennas into a cluster map, wherein each cluster in the cluster map corresponds to a different RF source.

Example 68: The method of example 67, wherein the cluster map comprises an angle estimate plotted against power for the received signals.

Example 69: The method of example 67, comprising identifying a location estimate for each cluster in the cluster map.

Example 70: The method of example 67, comprising identifying a corresponding power for each angle estimate and identifying at least one RF source based at least in part on the corresponding power.

Example 71: A method for identifying at least one RF source, the method comprising: generating a first set of candidate locations for the RF source based at least in part on a cross correlation of signals received at a first antenna and a second antenna of a sensor system at a single location, the first antenna and second antenna being in a first orientation; moving the first antenna and the second antenna from the first orientation into a second orientation; generating a second set of candidate locations for the RF source based at least in part on a cross correlation of received signals at the first antenna and the second antenna of the sensor system at the single location, the first antenna and second antenna being in the second orientation; estimating a location of the RF source based on the first set of candidate locations and the second set of candidate locations.

Example 72: The method of example 71, wherein moving the first antenna and the second antenna from the first orientation into the second orientation comprises rotating at least one of the first antenna or the second antenna around a point associated with the sensor system.

Example 73: The method of example 72, comprising causing the first and second antennas to rotate at least 20 degrees from an initial orientation.

Example 74: The method of example 72, comprising causing the first and second antennas to rotate at least 45 degrees from an initial orientation.

Example 75: The method of example 72, comprising causing the first and second antennas to rotate at least 90 degrees from an initial orientation.

Example 76: The method of example 72, comprising causing the first and second antennas to rotate at least 125 degrees from an initial orientation.

Example 77: A method for identifying at least one RF source, the method comprising: generating a first set of candidate locations for the RF source based at least in part on a cross correlation of signals received at a first antenna and a second antenna of a sensor system at a first location; generating a second set of candidate locations for the RF source based at least in part on a cross correlation of received signals at the first antenna and the second antenna of the sensor system at a second location different from the first location;

- estimating a location of the RF source based on the first set of candidate locations and the second set of candidate locations.

Example 78: The method of example 77, wherein the sensor system is configured to be coupled to a moving vehicle.

Example 79: The method of example 77, wherein the moving vehicle is a winged aircraft or a drone.

Example 80: A method for identifying at least one RF source, the method comprising:

- generating a first set of candidate locations for the RF source based at least in part on a cross correlation of signals received at a first antenna pair of a sensor system at a single location, wherein the sensor system comprises three or more antennas;
- generating a second set of candidate locations for the RF source based at least in part on a cross correlation of received signals at a second antenna pair of the sensor system at the single location, the second antenna pair comprising a different subset of antennas of the three or more antennas than the first antenna pair;
- estimating a location of the RF source based on the first set of candidate locations and the second set of candidate locations.

Example 81: The method of example 80, wherein the sensor system comprises three antennas in an equilateral triangle configuration.

Example 82: The method of example 80, wherein a distance between antennas in the first antenna pair is the same as the distance between antennas in the second antenna pair.

Example 83: A method for determining a location of at least one RF source, the method comprising: generating a first set of angle estimates based at least in part on a cross correlation of signals received at a first antenna and a second antenna of a plurality of antennas; analyzing the first set of angle estimates to determine a first set of clusters, each cluster comprising one or more angles of the first set of angle estimates; determining a received power for each cluster of the first set clusters; generating a second set of angle estimates based at least in part on a cross correlation of signals received at the first antenna and a third antenna of the plurality of antennas; analyzing the second set of angle estimates to determine a second set of clusters, each cluster comprising one or more angles of the second set of angle estimates; determining a received power for each cluster of the second set clusters; determining a mapping between the first set of clusters and the second set of clusters based at least in part on a comparison of the received powers of the first set of clusters and the received powers of the second set of clusters; and identifying a location of at least one RF source based at least in part on the mapping.

Example 84: The method of example 83 comprising determining whether any clusters are new based on a comparison with a previous mapping.

Example 85: The method of example 84 wherein determining whether any clusters are new comprises applying a Kalman filter to the mapping.

Example 86: The method of example 85 comprising updating the Kalman filter in response to determining that there is at least one new cluster.

Example 87: The method of example 83 comprising assigning each cluster of the first set of clusters or the second set of clusters to an RF source.

Example 88: The method of example 83 comprising: generating a third set of angle estimates based at least in part on a cross correlation of signals received at the second antenna and the third antenna of the plurality of antennas; analyzing the third set of angle estimates to determine a third set of clusters, each cluster comprising one or more angles of the third set of angle estimates; and determining a received power for each cluster of the third set of clusters.

Example 89: The method of example 88 comprising determining the mapping based at least in part on the third set of clusters.

Example 90: A method of identifying a plurality of RF sources, the method comprising: Identifying a set of angle estimates for at least one RF source; Grouping the set of angle estimates into at least one cluster of angle estimates; Determining a received power associated with the at least one cluster of angle estimates; Determining a mapping of at least one cluster of angle estimates based at least in part on the received power; and Identifying at least one location estimate of at least one RF source based on the mapping.

Example 91: The method of example 90, comprising assigning at least one cluster to an identified RF source based on the mapping.

Example 92: The method of Example 90 wherein said identifying a set of angle estimates is based on a cross correlation of signals received at an antenna pair of a sensor system at a single location.

Example 93: The method of Example 92 comprising generating a second mapping of potential RF sources associated with a second time or a different antenna pair in a sensor system.

Example 94: The method of Example 93 comprising updating or seeding a Kalman filter based on the comparison.

Example 95: The method of Example 94 comprising identifying new or previously unknown RF sources based on the Kalman filter.

Example 96: A system for identifying at least one RF source, the system comprising: one or more hardware processors, the one or more hardware processors configured to: generate a first set of candidate locations for the RF source based at least in part on a cross correlation of signals received at a first antenna and a second antenna of a sensor system, the first antenna and second antenna being in a first orientation, the first antenna positioned adjacent to the second antenna; move the first antenna and the second antenna from the first orientation into a second orientation; generate a second set of candidate locations for the RF source based at least in part on a cross correlation of received signals at the first antenna and the second antenna of the sensor system, the first antenna and second antenna being in the second orientation; estimate a location of the RF source based on an intersection of the first set of candidate locations and the second set of candidate locations.

Example 97: The system of example 96, wherein the first and second antenna are spaced a distance from each other a multiple of a wavelength of the carrier wave of the RF source.

Example 98: The system of example 97, wherein the distance comprises less than or equal to one wavelength of a carrier wave of the RF source Example 99: The system of example 98, wherein the distance comprises up to and including approximately one meter.

Example 100: The system of example 96, wherein to generate the first set of candidate locations, the one or more processors are configured to determine a first set of candidate angles for the RF source based on the cross correlation of signals received at the first and second antennas when the first and second antennas are in the first orientation; and determine the first set of candidate locations based on a projection of the first set of candidate angles on a plane.

Example 101: The system of example 96, wherein the first set of candidate locations includes at least one hyperbolic portion.

Example 102: The system of example 96, wherein to generate the second set of candidate locations, the one or more processors are configured to determine a second set of candidate angles for the RF source based on the cross correlation of signals received at the first and second antennas when the first and second antennas are in the second orientation; and determine the first set of candidate locations based on a projection of the second set of candidate angles on a plane.

Example 103: The system of example 96, wherein the second set of candidate locations includes at least one hyperbolic portion.

Example 104: The system of example 96, wherein the estimated location is in both the first and second sets of candidate locations.

Example 105: The system of example 96, wherein the estimated location is in either the first or second sets of candidate locations.

Example 106: The system of example 96, wherein the one or more hardware processors are configured to estimate the location of the RF source by computing confidence values for candidate locations in the first and second set of candidate locations.

Example 107: The system of example 96, wherein the estimated location corresponds to the highest confidence value.

Example 108: The system of example 96 wherein an intersection comprises a density of overlapping location estimates in the first and second candidate locations.

Example 109: The system of example 96 wherein an intersection comprises an intersection point in or near an overlapping region of the first and second sets of candidate locations.

Example 110: The system of example 109 wherein the location of the RF source comprises a location that is near the intersection point.

Example 111: The system of example 96, wherein moving the first antenna and the second antenna from the first orientation into the second orientation comprises rotating at least one of the first antenna or the second antenna around a point associated with the sensor system.

Example 112: The system of example 96, wherein the one or more hardware processors are configured to cause the first and second antennas to rotate at least 20 degrees from an initial orientation.

Example 113: A system for identifying at least one RF source, the system comprising: one or more hardware processors, the one or more hardware processors configured to: generate a first set of candidate locations for the RF source based at least in part on a cross correlation of signals received at a first antenna and a second antenna of a sensor system at a first location; generate a second set of candidate locations for the RF source based at least in part on a cross correlation of received signals at the first antenna and the second antenna of the sensor system at a second location different from the first location; estimate a location of the RF source based on an intersection of the first set of candidate locations and the second set of candidate locations.

Example 114: The system of example 113, wherein the sensor system is configured to be coupled to a moving vehicle.

Example 115: The system of example 114, wherein the moving vehicle is a winged aircraft or a drone.

Example 116: A system for identifying at least one RF source, the system comprising: one or more hardware processors, the one or more hardware processors configured to: generate a first set of candidate locations for the RF source based at least in part on a cross correlation of signals received at a first antenna pair of a sensor system at a single location, wherein the sensor system comprises three or more antennas; generate a second set of candidate locations for the RF source based at least in part on a cross correlation of received signals at a second antenna pair of the sensor system at the single location, the second antenna pair comprising a different subset of antennas of the three or more antennas than the first antenna pair; estimate a location of the RF source based on an intersection of the first set of candidate locations and the second set of candidate locations.

Example 117: The system of example 116, wherein the sensor system comprises three antennas in an equilateral triangle configuration.

Example 118: The system of example 116, wherein a distance between antennas in the first antenna pair is the same as the distance between antennas in the second antenna pair.

Example 119: A system for determining a location of at least one previously unidentified RF source, the system comprising: a sensor system comprising a plurality of antennas, the plurality of antennas configured to receive signals from a plurality of RF sources; and one or more hardware processors in communication with the sensor system, the one or more hardware processors configured to: generate a first set of angle estimates based at least in part on a cross correlation of signals received at a first antenna and a second antenna of the plurality of antennas; group the first set of angle estimates into a first grouping comprising a plurality of clusters of angle estimates, wherein each cluster in the first grouping is associated with a candidate RF source; determine a first set of received powers for each candidate RF source of the first grouping; generate a second set of angle estimates based at least in part on a cross correlation of signals received at the first antenna and a third antenna of the plurality of antennas; group the second set of angle estimates into a second grouping comprising a plurality of clusters of angle estimates, wherein each cluster in the second grouping is associated with a candidate RF source; determine a second set of received powers for each candidate RF source of the second grouping; determine a mapping between the first and second grouping based at least in part on a comparison of the first and second sets of received powers; and identify at least one previously unidentified RF source of the plurality of RF sources based on the mapping.

Example 120: The system of example 119, wherein the one or more hardware processors is configured to identify a location of at least one RF source of the plurality of RF sources based at least in part on the first set of angle estimates.

Example 121: The system of example 119, wherein the one or more hardware processors is configured to identify a location of at least one RF source of the plurality of RF sources based at least in part on the second set of angle estimates.

Example 122: The system of example 119, wherein a previously unidentified RF source comprises an RF source associated with the second grouping and not associated with the first grouping.

Example 123: The system of example 119 wherein to determine the previously unidentified RF source, the one or more hardware processors are configured to apply a Kalman filter to the mapping.

Example 124: The system of example 119, wherein the one or more hardware processors are configured to update the Kalman filter in response to determining that there is at least one new cluster.

Example 125: The system of example 119, wherein the one or more hardware processors are configured to:

generate a third set of angle estimates based at least in part on a cross correlation of signals received at the second antenna and the third antenna of the plurality of antennas;

group the third set of angle estimates into a third grouping comprising a plurality of clusters of angle estimates, wherein each cluster in the third grouping is associated with a candidate RF source; and determine a third set of received power for each candidate RF source of the third grouping.

Example 126: The system of example 125, wherein the one or more hardware processors are configured to determine the mapping based at least in part on the third set of clusters.

Example 127: A system for determining a location of at least one RF source previously unidentified RF source, the system comprising: a movable platform; a plurality of antennas coupled to the movable platform, wherein the plurality of antennas configured to receive signals from a plurality of RF sources in the environment of the movable platform, wherein at least one pair of antennas of the plurality of antennas are spaced a distance from each other of less than or equal to one wavelength of a carrier wave of the RF source; and one or more hardware processors configured to communicate with the plurality of antennas and generate an identify the presence of at least one RF source of the plurality of RF sources based at least in part on a received power associated with the signals and two or more cross correlations of signals received at different pairs of antennas of the plurality of antennas.

Example 128: The system of example 127, wherein the movable platform comprises a winged aircraft or drone.

Example 129: The system of example 127 wherein the plurality of antennas comprises three antennas.

Example 130: The system of example 127 wherein the one or more hardware processors are configured to estimate a location of the at least one RF source of the plurality of RF sources.

Example 131: The system of example 127 comprising at least one actuator configured to rotate the plurality of antennas.

Terminology

Embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A system for identifying at least one RF source, the system comprising:

one or more hardware processors, the one or more hardware processors configured to:

generate a first set of candidate locations for an RF source based at least in part on a cross correlation of signals received at a first antenna and a second antenna of a sensor system, the first antenna and second antenna being in a first orientation, the first antenna positioned adjacent to the second antenna;

move the first antenna and the second antenna from the first orientation into a second orientation;

generate a second set of candidate locations for the RF source based at least in part on a cross correlation of received signals at the first antenna and the second antenna of the sensor system, the first antenna and second antenna being in the second orientation;

estimate a location of the RF source based on an intersection of the first set of candidate locations and the second set of candidate locations.

2. The system of claim 1, wherein the first and second antenna are spaced a distance from each other a multiple of a wavelength of a carrier wave of the RF source.

3. The system of claim 2, wherein the distance comprises less than or equal to one wavelength of a carrier wave of the RF source.

4. The system of claim 3, wherein the distance comprises up to and including approximately one meter.

5. The system of claim 1, wherein to generate the first set of candidate locations, the one or more processors are configured to determine a first set of candidate angles for the RF source based on the cross correlation of signals received at the first and second antennas when the first and second antennas are in the first orientation; and determine the first set of candidate locations based on a projection of the first set of candidate angles on a plane.

6. The system of claim 1, wherein the first set of candidate locations includes at least one hyperbolic portion.

7. The system of claim 1, wherein to generate the second set of candidate locations, the one or more processors are configured to determine a second set of candidate angles for the RF source based on the cross correlation of signals received at the first and second antennas when the first and second antennas are in the second orientation; and determine the first set of candidate locations based on a projection of the second set of candidate angles on a plane.

8. The system of claim 1, wherein the second set of candidate locations includes at least one hyperbolic portion.

9. The system of claim 1, wherein the estimated location is in both the first and second sets of candidate locations.

10. The system of claim 1, wherein the estimated location is in either the first or second sets of candidate locations.

11. The system of claim 1, wherein the one or more hardware processors are configured to estimate the location of the RF source by computing confidence values for candidate locations in the first and second set of candidate locations.

12. The system of claim 1, wherein the estimated location corresponds to a highest confidence value.

13. The system of claim 1 wherein an intersection comprises a density of overlapping location estimates in the first and second candidate locations.

14. The system of claim 1 wherein an intersection comprises an intersection point in or near an overlapping region of the first and second sets of candidate locations.

15. The system of claim 1, wherein moving the first antenna and the second antenna from the first orientation into the second orientation comprises rotating at least one of the first antenna or the second antenna around a point associated with the sensor system.

16. A system for determining a location of at least one RF source previously unidentified RF source, the system comprising:

a movable platform;

a plurality of antennas coupled to the movable platform, wherein the plurality of antennas configured to receive signals from a plurality of RF sources in an environment of the movable platform, wherein at least one pair of antennas of the plurality of antennas are spaced a distance from each other of less than or equal to one wavelength of a carrier wave of the RF source; and one or more hardware processors configured to communicate with the plurality of antennas and identify a presence of at least one RF source of the plurality of RF sources based at least in part on a received power associated with the signals and two or more cross correlations of signals received at different pairs of antennas of the plurality of antennas.

17. The system of claim 16, wherein the movable platform comprises a winged aircraft or drone.

18. The system of claim 17 wherein the plurality of antennas comprises three antennas.

19. The system of claim 16 wherein the one or more hardware processors are configured to estimate a location of the at least one RF source of the plurality of RF sources.

20. The system of claim 16 comprising at least one actuator configured to rotate the plurality of antennas.

* * * * *